(12) United States Patent
Koren et al.

(10) Patent No.: US 11,016,791 B2
(45) Date of Patent: *May 25, 2021

(54) METHOD AND SYSTEM FOR DECLARATIVE CONFIGURATION OF USER SELF-REGISTRATION PAGES AND PROCESSES FOR A SERVICE PROVIDER AND AUTOMATIC DEPLOYMENT OF THE SAME

(71) Applicant: salesforce.com, Inc., San Francisco, CA (US)

(72) Inventors: Sergio Isaac Koren, San Francisco, CA (US); Alan Vangpat, Pittsburgh, PA (US); William Charles Mortimore, Jr., San Francisco, CA (US); Ian Glazer, Washington, DC (US)

(73) Assignee: salesforce.com, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/929,897

(22) Filed: May 28, 2020

(65) Prior Publication Data
US 2020/0293340 A1 Sep. 17, 2020

Related U.S. Application Data

(63) Continuation of application No. 16/047,808, filed on Jul. 27, 2018, now Pat. No. 10,705,860.

(51) Int. Cl.
*G06F 3/0482* (2013.01)
*G06F 9/451* (2018.01)
(Continued)

(52) U.S. Cl.
CPC ............ *G06F 9/451* (2018.02); *G06F 3/0482* (2013.01); *G06F 3/0484* (2013.01);
(Continued)

(58) Field of Classification Search
CPC ...... G06F 3/0482; G06F 3/0484; G06F 9/451; H04L 63/0861; H04L 41/0253;
(Continued)

(56) References Cited

U.S. PATENT DOCUMENTS 5,577,188 A 11/1996 Zhu
5,608,872 A 3/1997 Schwartz et al.
(Continued)

OTHER PUBLICATIONS

Jaroslav Kadlec et al., Implementation of an Advanced Authentication Method Within Microsoft Active Directory Network Services, Sep. 1, 2010, IEEE Computer Society, pp. 453-456 (Year: 2010).*

(Continued)

*Primary Examiner* — Tam T Tran
(74) *Attorney, Agent, or Firm* — LKGlobal | Lorenz & Kopf, LLP

(57) ABSTRACT

Methods and systems are provided for configuring for declaratively configuring a user self-registration process and a user self-registration page process for a particular service provider. A graphical user interface is displayed that includes a plurality of options for declaratively configuring different user self-registration processes and corresponding user self-registration pages for the particular service provider. One of the options can be selected, and a type of identifier and a type of verification process can be specified from different types for each. The type of identifier is associated with a user to be verified as part of the user self-registration process, and can be specified to define how the user is identified and looked-up during the user self-registration process. The type of verification process can define how the user will be verified as part of the user self-registration process.

20 Claims, 12 Drawing Sheets

(51) Int. Cl.
  *G06F 3/0484* (2013.01)
  *H04L 29/06* (2006.01)
  *H04L 12/24* (2006.01)

(52) U.S. Cl.
  CPC ...... *H04L 41/0253* (2013.01); *H04L 63/0838* (2013.01); *H04L 63/0861* (2013.01); *H04L 63/0884* (2013.01); *H04L 65/1073* (2013.01)

(58) Field of Classification Search
  CPC .............. H04L 63/0884; H04L 65/1073; H04L 63/0815; H04L 63/083; H04L 67/10
  See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0199622 A1* | 10/2004 | Huscher ............... G06F 9/4411 709/223 |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0125677 A1* | 6/2005 | Michaelides ......... H04L 9/3234 713/185 |

(56) References Cited

U.S. PATENT DOCUMENTS

| | | |
|---|---|---|
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2015/0052496 A1* | 2/2015 | Helms ................... G06F 8/34 717/109 |
| 2016/0381080 A1* | 12/2016 | Reddem ............... G06F 21/31 726/1 |
| 2017/0187714 A1* | 6/2017 | Guo ..................... H04L 67/28 |

OTHER PUBLICATIONS

Vinicius Pacheco et al., SaaS Anonymous Cloud Service Consumption Structure, Jun. 1, 2012, IEEE Computer Society, pp. 491-499 (Year: 2012).*

* cited by examiner

| Organization | Service Provider | Log in prompt for user lookup | Type of authentication mechanism to be used |
|---|---|---|---|
| A | 1 | Email address | Prompt for a one-time passcode delivered to email address |
| A | 2 | Social security number | Prompt for a password |
| B | - | Phone number | Prompt for a one-time passcode delivered via text message |
| C | - | Email address | Redirect to facebook |
| D | - | Email address | Prompt for a one-time passcode delivered to email address |
| E | - | Other identifier | Redirect to SAML identity provider |

Table 1

METHOD AND SYSTEM FOR DECLARATIVE CONFIGURATION OF USER SELF-REGISTRATION PAGES AND PROCESSES FOR A SERVICE PROVIDER AND AUTOMATIC DEPLOYMENT OF THE SAME

CROSS-REFERENCE TO RELATED APPLICATIONS

This application is a Continuation of U.S. application Ser. No. 16/047,808, filed Jul. 27, 2018, the contents of which are hereby incorporated by reference.

TECHNICAL FIELD

Embodiments of the subject matter described herein relate generally to cloud-based computing and deployment of user self-registration pages and processes and log in pages and processes for service providers. More particularly, embodiments of the subject matter relate to methods and systems for declaratively configuring user self-registration pages and processes, and log in pages and processes, for service providers and automatic deployment of such user self-registration pages and processes and log in pages and processes.

BACKGROUND

Today many enterprises now use cloud-based computing platforms that allow services and data to be accessed over the Internet (or via other networks). Infrastructure providers of these cloud-based computing platforms offer network-based processing systems that often support multiple enterprises (or tenants) using common computer hardware and data storage. This "cloud" computing model allows applications to be provided over a platform "as a service" supplied by the infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without compromising data security. Generally speaking, multi-tenancy refers to a system where a single hardware and software platform simultaneously supports multiple organizations or tenants from a common data storage element (also referred to as a "multi-tenant database"). The multi-tenant design provides several advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost-effective sharing of similar application feature software between multiple sets of users.

A cloud-based computing environment can include a number of different data centers, and each data center can include a number of instances, where each instance can support many tenants (e.g., 10,000 tenants or more). As such, large numbers of tenants can be grouped together into and share an instance as tenants of that instance. Each tenant is its own organization (or org) that is identified by a unique identifier (ID) that represents that tenant's data within an instance.

Consumers may use computer network systems, such as the Internet, to access a variety of data, applications, services, and other resources. Prior to allowing a user to access system resources, an authentication procedure is often employed to reliably verify the identity of the user. For example, passwords may be used for user authentication to prove an identity and/or to gain access to a protected resource. For instance, during a log in process a user may send a username and password to a remote server or server system in order to authenticate the user for access to resources provided by that server system. Even more generally, a username and password may be used to control access to protected computing devices, operating systems, applications (e.g., email, web sites, etc.), databases, networks, etc.

The password has long been a thorn in the side of users and organizations alike, and it is also the root of many serious and costly problems. Password-based authentication can be somewhat cumbersome to the user because having to remember and manage multiple passwords for multiple applications or services is difficult. For example, each resource typically requires its users to have unique usernames. A user may be required to remember several different usernames in order to access different resources. A user has to keep track of which username was used to set up the account for each resource. Likewise, each resource may have different rules as to the types of character strings that may be used as passwords (e.g., a particular number of characters, a combination of alphabetic and numeric characters, at least one special character (such as !, @, #, $, %, &, etc.). Thus, in addition to remembering different usernames, a user may also be required to remember several different passwords in order to access different resources, and also keep track of which username-password pair applies to each account. As a result, users often use simple passwords and/or reuse the same password across multiple services and that can negatively impact security. Weak, default, or stolen credentials are often involved in or the cause of data breaches.

To improve security, organizations often require stronger password complexity and more frequent changes, but this often leads to poor user security practices, such as writing passwords down or using the same password for multiple applications, and increased costs because users forget their passwords and have to call for resets. In addition, the service provider in a particular organization that has the poorest security controls becomes the weakest link, and if this service provider gets compromised (or any other service provider), the credentials to all the other service providers get compromised too. Organizations also lose productivity when users use passwords to log in separately to multiple applications each day to do their jobs. Many organizations feel they have to sacrifice security for user convenience. From a security perspective, password-based authentication may be vulnerable to certain types of attacks or other security issues in addition to problems associated with remembering and keeping track of different usernames and password combinations for different accounts.

As password-based authentication has become more susceptible to being compromised in recent years, interview-based authentication solutions (e.g., passwordless authentication solutions) have recently been developed that aim to eliminate authentication vulnerabilities. Today, some Internet websites or service providers implement some form of passwordless log in that allow their users to log in without a password, often by sending a one-time-password over email or SMS to the end user when user tries to log in. Examples of passwordless authentication can include Touch ID, push notifications, onetime passcodes, etc. Passwordless authentication is not only more secure, but easier, friendlier, and faster than traditional password-based authentication solutions.

In a multi-tenant environment, each tenant is tasked with implementing proprietary solutions for user self-registration log in and deploying those solutions to end users. Moreover, within a single tenant, each service provider may also be tasked with implementing proprietary solutions for user self-registration and log in and deploying those solutions to end users. This process can be very time-consuming for each service provider of a particular application or service. For example, one drawback is that the process of setting up user self-registration and log in functionality is very complex, unique and relatively static once it is set up and defined. Each implementation requires lots of set up and coding that has to be specific to that implementation and the underlying technology involved. For example, a text or SMS passwordless log in solution would require completely different set up and coding in comparison to an email-based passwordless log in solution. The process of implementing proprietary solutions for user self-registration and log in is not only very time-consuming, but inefficient in the event the service provider wants to provide users with multiple different user self-registration and log in options. This would require completely different set up and coding for each implementation.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 7 is a table that illustrates non-limiting examples of different implementations of configurable log in capability that have been customized for different service providers in accordance with the disclosed embodiments.

DETAILED DESCRIPTION

Figure 1:
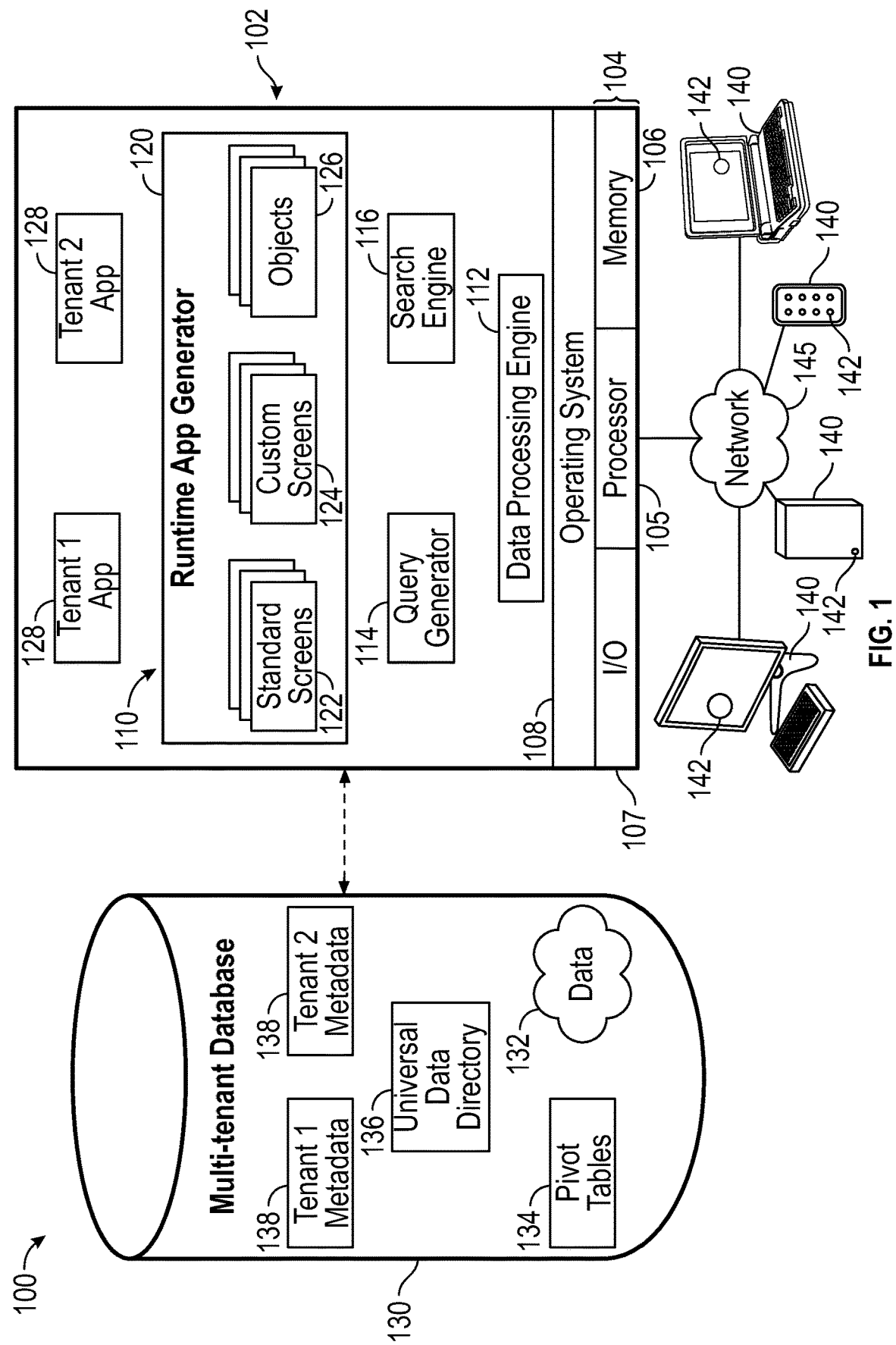
FIG. 1 is a schematic block diagram of an example of a multi-tenant computing environment in which features of the disclosed embodiments can be implemented in accordance with the disclosed embodiments.

It would be desirable to simplify and automate the process of setting up a user self-registration page and a log in page so that it can be easily customized for different service providers who offer applications or services via a multi-tenant cloud-based platform. It would also be desirable to provide a solution that makes it easy to build and deploy user self-registration and log in processes without requiring development of a proprietary solution for each service provider.

The exemplary embodiments presented here relate to systems, methods, procedures, and technology for declaratively configuring log in pages and processes for service providers and automatic deployment of such log in pages and processes, and their associated user self-registration pages and processes. The disclosed embodiments can be used, for example, by administrators of many different service providers (e.g., of a particular organization/tenant) for configuring setup of user self-registration and interview-based log in capability that is customized for their respective service providers. For example, in some implementations, the disclosed embodiments can provide a declarative UI-based system that allows administrators for different service providers (e.g., administrators for different organizations or tenants of a multi-tenant system) to set up their own customized self-registration process and/or customized interview-based log in solution (e.g., a passwordless log in solution) for users who want to access or interact with applications or services provided by that service provider (e.g., services provided by an organization/tenant via a cloud computing platform). In other words, each administrator can utilize the disclosed technologies to automate the processes of (1) setting up a self-registration process for that service provider, and/or (2) setting up an interview-based log in solution for that service provider. As will be described below, in accordance with the disclosed embodiments, an administrator can select a type of user credential, and an option for self-registration verification process, that could be linked to the type of user credential, or could be separate from the type of user credential depending on the implementation. The self-registration verification process allows the user credential entered at the prompt presented at the corresponding user self-registration page to be verified. Similarly, an administrator can specify a type of log in prompt, and an authentication mechanism that can include one or more of: commonly used authentication techniques, verification processes including verification challenges, etc. The disclosed embodiments can eliminate the need for an intensive set up and coding effort (e.g., manual creation of user interfaces and user mapping) that would normally be needed to provide a log in solution and associated self-registration process that can be customized for each service provider. For example, the disclosed embodiments can allow each organization or tenant (e.g., same underling data partition) to easily implement different logic to allow for multiple setups for different log in pages and processes for different service providers (e.g., sub-divisions of that single organization or tenant) and their associated self-registration pages and processes.

Prior to describing an exemplary embodiment with reference to the drawings, certain terminology will be defined.

As used herein, the term "multi-tenant database system" refers to those systems in which various elements of hardware and software of the database system may be shared by one or more tenants. For example, a given application server may simultaneously process requests for a great number of tenants, and a given database table may store rows for a potentially much greater number of tenants. In a multitenant architecture, a number of tenants share IT resources such as database servers, application servers, and infrastructure required to run applications, resulting in an environment where resources are managed centrally.

A cloud-based computing environment can include a number of different data centers. Each data center can include a number of instances. Each instance can support many (e.g., 10,0000) tenants, where each tenant has their own organization (or org).

An instance (also known as a point of deployment (POD)) is a cluster of software and hardware represented as a single logical server that hosts multiple organization's data and runs their applications. An instance can be a self-contained unit that contains all that is required to run an instance including the application server, database server, database itself, search and file system. Large numbers of tenants, for example, 10,000, can be grouped together into and share an instance as tenants of that instance. A platform as a service (PaaS), such as the Force.com platform, can run on multiple instances, but data for any single organization is always stored on a single instance where their data resides. Each tenant is allocated to one and only one instance (or POD) and that is where their data resides. As such, an instance refers to a single logical server that multiple organizations live on as tenants. An instance can be identified in a URL by a region and a server number. For example, if it is assumed that there are currently 21 instances in North America, in the URL na8.salesforce.com, nab can refer to particular server, where na refers to the general location of the server (North America) and 8 refers to the serverID within that general location (server 8 of 21 in North America).

An organization or "org" can be thought of as a logical container for one cohesive set of related data, metadata, configurations, settings and schemas that is separate from that of all other organizations. Each organization has or is associated with a unique identifier (ID) that represents a tenant's data within an instance. Each identifier defines a virtual or logical space provided to an individual tenant (e.g., a defined set of users) where all of that tenant's data and applications are stored within an instance so that it is separate from that of all other organizations that are part of that instance. Each unique identifier serves as the access key and security barrier for an individual tenant's data in the system. As such, each organization can be identified by its own unique identifier that allows that organization's data to be separated from data of other organizations. Even though all tenants within an instance share the same database, the organization's unique identifier is stored in every table to ensure that every row of data is linked back to the correct tenant and the data from other tenants sharing the same instance cannot be mixed up. Each organization can have its own custom content that is unique to that particular organization. For a particular organization, custom content can include metadata and associated data that is unique to that particular organization. Each organization can have custom fields, custom objects, workflows, data sharing rules, visual force pages and apex coding, etc. As such, each organization can be highly customized with respect to other organizations that are part of the same instance.

An environment is an organization used for a specific purpose. An organization can be used as a production environment unless it is housed on a sandbox instance, in which case the organization can be used for development, testing, integration, training or other non-production purposes. For example, tenants may have an organization is used as a production environment, another organization used for a development environment, another organization used for testing environment, another organization used for integration environment, another organization used for their training environment.

The terms "self-registration" or "sign up" as used herein can refer to self-registration processes involved in registering with or subscribing to an application or service, joining a network, creating an account, etc.

The term "log in" (or log on or sign in or sign on) can all refer to processes by which an individual gains access to a computer system by identifying and authenticating themselves by presenting appropriate credentials. In practice, modern secure systems also often require a second factor for extra security. As such, the terms "log in," "log on," "sign in," and "sign on") can be used interchangeably herein to refer, for example, to the act of logging into a web-based application or service that is served by a server system, the act of logging into a remote or networked computer system, the act of logging into a database, the act of logging into a mobile device, the act of logging into a computer, such as a multiuser computer, etc.

As used herein, a "verification process" can refer to a process that is used to verify or confirm something about a user. For example, in the context of a user self-registration process, a verification process can refer to a process that is used to create an identity for a registrant within a system that allows that registrant to become registered with the system, and verify that the registrant's credentials are valid. For example, in a user self-registration process, a user can confirm that a user credential (e.g., phone number or email) they are providing is theirs. In other words, the user is verifying/confirming/authenticating that a user credential they are providing, which is tied to the user's identity, is correct. By contrast, in the context of a user log in process, a verification process can refer to a process that is used to confirm identity of a user that is trying to log in to a system, and can include authentication mechanisms including identity verification challenge protocols. For example, in the context of a user log in process, a phone, email, or a redirection to a third-party identity provider (IdP) can be used to authenticate a user. Thus, the verification process can verify who the user is via some previously-known mechanism (e.g., Facebook API results, a pin sent to a mobile phone number, etc.).

FIG. 1 is a schematic block diagram of an example of a multi-tenant computing environment in which features of the disclosed embodiments can be implemented in accordance with the disclosed embodiments. As shown in FIG. 1, an exemplary cloud-based solution may be implemented in the context of a multi-tenant system 100 including a server 102 that supports applications 128 based upon data 132 from a database 130 that may be shared between multiple tenants, organizations, or enterprises, referred to herein as a multi-tenant database. Data and services generated by the various applications 128 are provided via a network 145 to any number of user systems 140, such as desktops, laptops, tablets, smartphones or other client devices, Google Glass™, and any other computing device implemented in an automobile, aircraft, television, or other business or consumer electronic device or system, including web clients.

Each application 128 is suitably generated at run-time (or on-demand) using a common application platform 110 that securely provides access to the data 132 in the database 130 for each of the various tenant organizations subscribing to the system 100. In accordance with one non-limiting example, the service cloud 100 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that shares access to common subset of the data within the multi-tenant database 130. In this regard, each tenant includes one or more users and/or groups associated with, authorized by, or otherwise belonging to that respective tenant. Stated another way, each respective user within the multi-tenant system 100 is associated with, assigned to, or otherwise belongs to a particular one of the plurality of enterprises supported by the system 100.

Each enterprise tenant may represent a company, corporate department, business or legal organization, and/or any other entities that maintain data for particular sets of users (such as their respective employees or customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other organizations.

The multi-tenant database 130 may be a repository or other data storage system capable of storing and managing the data 132 associated with any number of tenant organizations. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

In an exemplary embodiment, the database 130 includes a database management system or other equivalent software capable of determining an optimal query plan for retrieving and providing a particular subset of the data 132 to an instance of application (or virtual application) 128 in response to a query initiated or otherwise provided by an application 128, as described in greater detail below. The multi-tenant database 130 may alternatively be referred to herein as an on-demand database, in that the database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants.

Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like.

The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long-term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The application platform 110 is any sort of software application or other data processing engine that generates the virtual applications 128 that provide data and/or services to the user systems 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the user systems 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the user systems 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its user system 140, as appropriate.

The runtime application generator 120 suitably interacts with the query generator 114 to efficiently obtain multi-tenant data 132 from the database 130 as needed in response to input queries initiated or otherwise provided by users of the user systems 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled user system 140 on the network 145. In an exemplary embodiment, the user system 140 includes a display device, such as a monitor, screen, or another conventional electronic display capable of graphically presenting data and/or information retrieved from the multi-tenant database 130, as described in greater detail below.

Typically, the user operates a conventional browser application or other client program 142 executed by the user system 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. In some cases, to authenticate, the user can enter a client identifier and credential, such as a password. In some cases where users have many different log in credentials to remember for other systems, it can be difficult for the user to remember their password, username, or client identifier. To help make this log in process easier, many applications and services have developed "passwordless" authentication mechanisms. Passwordless authentication is not only more secure, but easier, friendlier, and faster than traditional password-based authentication solutions.

Examples of passwordless authentication mechanisms can include Touch ID, push notifications, or onetime passcodes. For instance, one widely used passwordless authentication mechanism is Auth0. In one form of passwordless authentication with Auth0, the user is asked to enter their email address. Once the user submits the email address, a unique token or code is created and stored. An email with a URL that contains the unique token will be generated and sent to the user. When the link is clicked by the user, a server verifies that the unique token is valid and exchanges it for a long-lived session or token, which is stored in your database and sent back to the client to be stored typically as a browser cookie. There are also be checks on the server to ensure that the link was clicked within a certain period, e.g., three minutes. In another form of passwordless authentication with Auth0, the user is requested to enter their email address. An email is sent to the user with a unique onetime code. Once the user enters this code into an application, the application validates that the code is correct, a session is initiated and the user is logged in. In yet another form of passwordless authentication with Auth0, the user is asked to enter a valid phone number. A unique onetime code is then sent to the phone number via SMS. Once the user enters this code into an application, the application validates that the code is correct and that the phone number exists and belongs to a user, a session is initiated, and the user logged in. In still another form of passwordless authentication with Auth0, the user is asked to place their finger on a mobile device. A unique key pair is generated on the device and a new user is created on the server that maps to the key. A session is initiated and the user is logged in. This is often referred to as Touch ID.

When the identified user requests access to a virtual application 128, the runtime application generator 120 suitably creates the application at run time based upon the metadata 138, as appropriate. However, if a user chooses to manually upload an updated file (through either the web-based user interface or through an API), it will also be shared automatically with all of the users/devices that are designated for sharing.

As noted above, the virtual application 128 may contain Java, ActiveX, or other content that can be presented using conventional client software running on the user system 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128. In various embodiments, application 128 embodies the functionality of a collaboration solution such as the Chatter system, described below.

Figure 2:
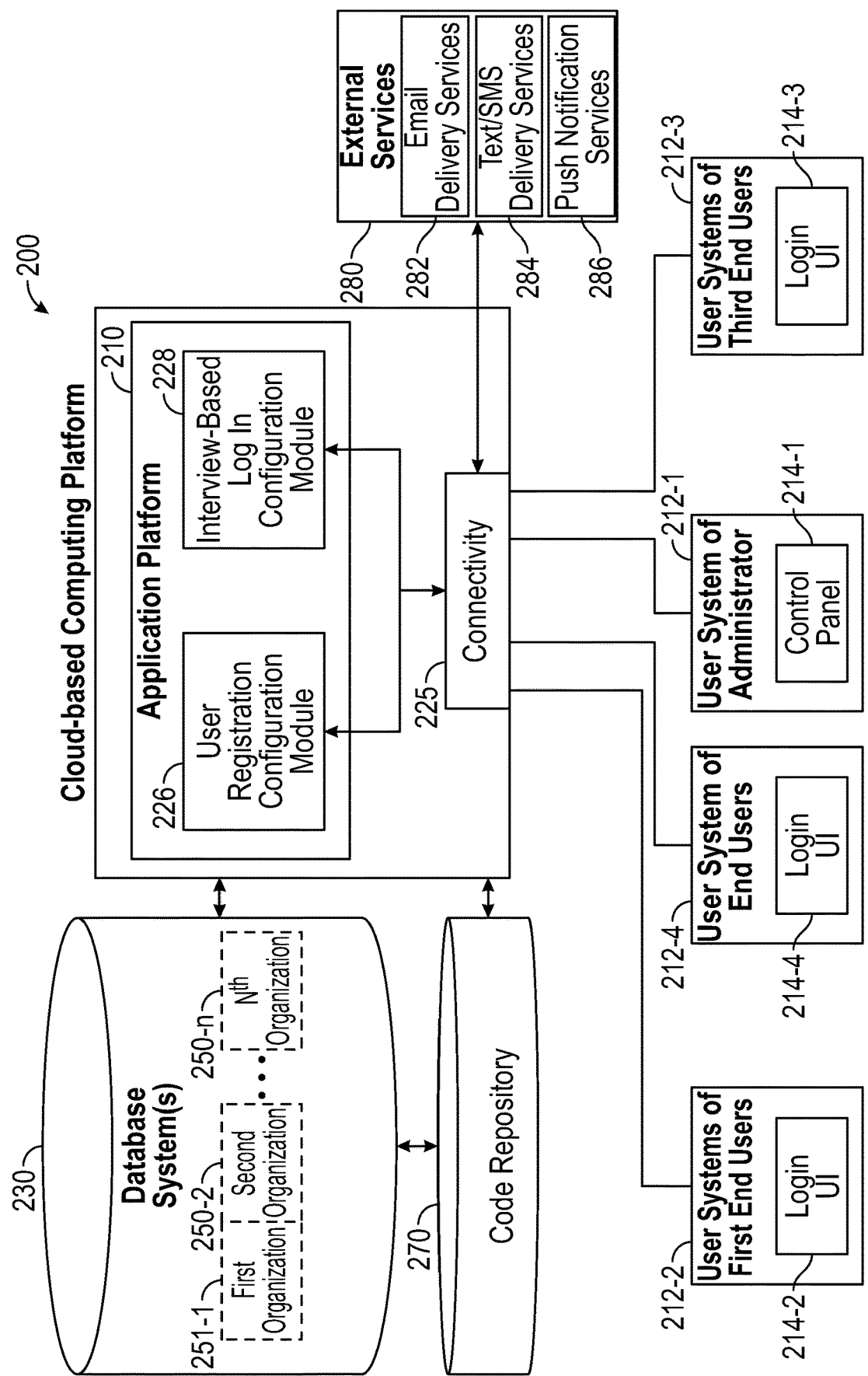
FIG. 2 is a block diagram of a system in accordance with the disclosed embodiments.

FIG. 2 is a block diagram of a cloud-based computing platform 200 in accordance with the disclosed embodiments. The cloud-based computing platform 200 is a system (e.g., cloud-based server system such as that in FIG. 1) that can be shared by many different organizations, and handles the storage of, and access to, different metadata, objects, data and applications across disparate organizations. In one embodiment, the cloud-based computing platform 200 can be part of a database system, such as a multi-tenant database system. The cloud-based computing platform 200 is configured to handle requests for any user associated with any organization that is a tenant of the system. Although not illustrated, the cloud-based computing platform 200 can include other components such as a system database, one or more processing systems that execute applications, process space where the application runs, and program code that will be described in greater detail below.

The cloud-based computing platform 200 includes a connectivity engine 225 serves as a network interface that allows users of user systems 212 to establish a communicative connection to the cloud-based computing platform 200 over a network (not illustrated in FIG. 2) such as the Internet or any type of network described herein. This allows the various user systems 212 to connect to application platform 200. In one embodiment, the connectivity engine 225 can include an OAuth generator that provides organization tokens for a particular session. OAuth is an open standard for authorization that provides to clients a secure delegated access to server resources on behalf of a resource owner. OAuth standards specify a process for resource owners to authorize access to their server resources without sharing their credentials. OAuth allows access tokens to be issued to clients by an authorization server, with the approval of the resource owner. The client can then use the access token to access the protected resources hosted by the resource server.

The cloud-based computing platform 200 includes an application platform 210 and various user systems 212 that access various applications and services provided by the application platform 210. The application platform 210 is a cloud-based user interface. For example, the application platform 210 can be a software as a service (SaaS) platform in one non-limiting embodiment. The application platform 210 has access to one or more database systems 230 that store information (e.g., data and metadata) for a number of different organizations 250-1, 250-2, . . . 250-n including user information, organization information, custom information, etc. The database systems 230 can include a multi-tenant database system 130 as described with reference to FIG. 1, as well as other databases or sources of information that are external to the multi-tenant database system 130 of FIG. 1.

In one embodiment, the multi-tenant database system 130 can store data in the form of records and customizations. As used herein, the term "record" refers to an instance of a data object created by a user of a database service, for example, about a particular (actual or potential) business relationship or project. The data object can have a data structure defined by the database service (a standard object) or defined by a subscriber (custom object). For example, a record can be for a business partner or potential business partner (e.g. a client, vendor, distributor, etc.) of the user, and can include an entire company, subsidiaries, or contacts at the company. As another example, a record can be a project that the user is working on, such as an opportunity (e.g. a possible sale) with an existing partner, or a project that the user is trying to get. In one embodiment implementing a multi-tenant database, all of the records for the tenants have an identifier stored in a common table. A record has data fields that are defined by the structure of the object (e.g. fields of certain data types and purposes). A record can also have custom fields defined by a user. A field can be another record or include links thereto, thereby providing a parent-child relationship between the records. Customizations can include custom database objects and fields, Apex Code, Visualforce, Workflow, etc.

In the example illustrated in FIG. 2, only three organizations 250-1, 250-2, 250-n are illustrated for sake of simplicity, but it should be appreciated that the computing platform 200 can provide applications and services and store data for any number of organizations. In other words, the n in 250-n can be any number. Each organization 250 can be thought of as a logical container for one cohesive set of related data, metadata, configurations, settings and schemas that is separate from that of all other organizations. Each organization 250 is illustrated in FIG. 2 using dotted-line boxes within the database system(s) 230 to represent that they are a logical boundary that logically segregates data and access to the data by a particular tenant. Although the organizations 250 are part of the same instance and share common infrastructure, each organization 250 has or is associated with a unique identifier (ID) that represents a tenant's data within an instance, and defines a virtual or logical space provided to an individual tenant (e.g., a defined set of users) where all of that tenant's data and applications are stored within an instance so that it is separate from that of all other organizations that are part of that instance. In this regard, the unique identifier for each organization serves as the access key and security barrier for an individual tenant's data in the system, and thus allows that organization's data to be separated from data of other organizations even though all tenants within an instance share the same database. The unique identifier for a particular organization is stored in every table to ensure that every row of data is linked back to the correct tenant and the data from other tenants sharing the same instance cannot be mixed up.

Each organization 250 is a source of metadata and data associated with that metadata that collectively make up an application or service. Each organization can have its own custom content that is unique to that particular organization, and can be highly customized with respect to other organizations that are part of the same instance. For a particular organization, custom content can include metadata and associated data that is unique to that particular organization. In one implementation, the metadata can include customized content of the organization 250-1 (e.g., customizations done to an instance that define business logic and processes for an organization). Some non-limiting examples of metadata can include, for example, customized content that describes a build and functionality of objects (or tables), tabs, fields (or columns), permissions, classes, pages (e.g., Apex pages), triggers, controllers, sites, communities, workflow rules, data sharing rules, automation rules and processes, etc. Data is associated with metadata to create an application or service. Data can be stored as one or more objects, where each object holds particular records for an organization. As such, data can include records (or user content) that are held by one or more objects.

Based on a user's interaction with a user system 212, the application platform 210 accesses an organization's data (e.g., records held by an object) and metadata that is stored at one or more database systems 230, and provides the user system 212 with access to applications (or services) based on that data and metadata.

As such, different organizations or tenants of organizations can use the application platform 210 to provide resources (e.g., applications and services) that are potentially accessible by end users who have successfully registered with and authenticated to allow them access to those resources. The various user systems 212-2 . . . 212-4 can access resources (e.g., interact with web pages, applications or services) provided by the cloud-based computing platform 200 so long as they have been granted access privileges. These resource providers can be referred to herein as "service providers." Each service provider may have different wants in terms of how their self-registration pages and processes are configured. Similarly, each service provider may have different wants in terms of how their log in pages and processes are configured.

In accordance with the disclosed embodiments, administrators for each service provider can declaratively configure, via the graphical user interface, a customized page and a corresponding customized process for that particular service provider, and deploy the customized page and the corresponding customized process to users via the application platform. In other words, any administrator of a particular service provider (e.g., a particular organization or tenant) can utilize a control panel 214-1 of their user system 212-1 to configure a process and a page for a particular service provider. For example, an administrator can access the application platform 210 via user system 212-1 to configure and deploy user registration pages/processes and interview-based log in pages/processes for any end users that desire access to applications or services offered by a service provider via the application platform 210. In accordance with the disclosed embodiments, user registration pages/processes and log in pages/processes can be configured to have a different handling for every end user. For instance, user A and B will see/access the same sign in page in order to log in into a service provider. However, user A could be challenged with email-based OTP, whereas user B could be challenged with SMS-based OTP. This difference in decision making regarding the log in page and process (and corresponding registration page and process) can be configured by an administrator. A code repository 270 stores the code used to implement the registration and log in processing and build associated pages. In one embodiment, the code repository 270 can be an application server/service that handles integration with other services that are involved in passwordless login. For example, the code repository can include a module that is responsible for sending text messages that include the identity verification code, another module that is responsible for sending identity verification code via email, another module that is responsible for sending a push notification with a verification request, etc. The code repository 270 can be accessed by the user registration configuration module 226 to retrieve code for building registration and log in pages with built in logic for a corresponding registration or log in process that are customized to meet their specific needs/requirements. An administrator can use the user registration configuration module 226 to configure and deploy a registration page and corresponding registration process for a particular service provider that is customized to meet their specific needs/requirements, and can use the log in configuration module 228 to configure and deploy a log in page and a corresponding log in process for that particular service provider that is customized to meet their specific needs/requirements. The registration and log in pages and corresponding registration and log in processes can be built by retrieving selected code from the code repository 270 based on inputs by the administrator. Based on information input by the administrator, the user registration configuration module 226 and the log in configuration module 228 can then automatically build registration and log in pages with specified processing features, and also execute processing to execute the corresponding registration and log in processes and the various verification methodologies described herein. To facilitate implementation any of the embodiments described herein, the application platform 210 and/or code repository 270 can be integrated with the external services 280 for verification, such as email delivery services 282, text/SMS delivery services 284, push notification services 286, or any other known external services 280 that can be used for verification, such as a third party identity provider or verification service, etc.

In general, an administrator can interact with a graphical user interface of the control panel to select one of a plurality of options for configuring different processes and pages for that particular service provider. For example, the administrator can interact with a GUI element to select one of the options to configure the process and the page. After selecting that option, the administrator can interact with another GUI element to specify a type of identifier associated with a user to be verified as part of the process for that particular service provider. The type of identifier is one of a plurality of different types of identifiers that can be specified by the administrator. The administrator can also interact with another GUI element to specify a type of verification process (e.g., a type or self-registration verification process or type of authentication mechanism to be used to authenticate user(s) during log in), such as, a type of identity verification challenge to define how the user will be verified) as part of the process for the service provider. The type of verification process is one of a plurality of different types of verification processes that can be specified by the administrator that allows the user credential entered at the prompt presented at the corresponding user self-registration page to be verified. An appropriate module 226, 228 at the application platform 210 can receive the inputs from the administrator can process them to automatically generate the page based on the administrator's inputs and selections.

As an example, when a user seeks to register for access to a resource provided by the particular service provider, module 226 at the application platform 210 can deploy the page (e.g., in response to a request from the user). For example, for a self-registration process, the page can allow a user to register as a user. Likewise, for a log in process, the page can allow the user to request access to a resource (e.g., a web site, an application or a service) offered by that particular service provider via the application platform 210 (assuming the log process is successfully completed by the user). The page includes features and logic for the process that have been customized for that particular service provider.

To configure the self-registration page/process, the administrator can select a user self-registration setup option to configure a user self-registration process and a corresponding user self-registration page for deployment by that particular service provider. The administrator can specify a user credential (e.g., email address, telephone number, or any other unique identifier for communication means associated with the user) that defines how the user will contacted to complete the user self-registration process. In one embodiment, the administrator can specify the type of verification process to define how the user will be verified as part of the user self-registration process for the service provider (e.g., specify an identity verification challenge such as verify your email by logging in to a Facebook account created with that email). The verification process is a corresponding self-registration verification process that specifies how a user will be verified as part of the user self-registration process (e.g., after entering the user credential at a prompt presented at the corresponding user self-registration page). The corresponding self-registration verification process can be, for example, a prompt for a one-time-password or passcode sent via text message or via email message, or a redirection to an identity provider. The administrator can also specify various other features of the self-registration page and process, such as, user fields that are to be included to collect user information during the user self-registration process (e.g., a first name of the user, a last name of the user, a username of the user, an email address of the user, a phone number of the user, and a nickname of the user), whether the user is required to set a password as part of the user self-registration process, user creation information required as part of the user self-registration process, etc. The corresponding user self-registration page can be used to register for access to any type of resource such as a web site, an application or a service offered by that particular service provider.

To configure the log in page/process, the administrator can select an interview-based log in option that allows the administrator to configure an interview-based log in process and a corresponding interview-based log in page for deployment by that particular service provider. The administrator can specify a type of log in prompt to define how the user is identified and looked-up during the interview-based log in process for the service provider. For example, the type of log in prompt can be configured to accept one or more of the following types of identifier information for the user: an email address of the user, a telephone number of the user, a social security number of the user, or another unique identifier information for the user. The administrator can also specify the type of authentication mechanism that defines how a user will be authenticated as part of the interview-based log in process for the service provider (e.g., after entering their identifier information at the specified log in prompt). For example, the type of authentication mechanism can include one or more of: a prompt for a password, or a passwordless authentication mechanism such as a prompt for a one-time-password or passcode sent to the user via text message or via email message, a redirection to an identity provider for single sign on (SSO) authentication, and a prompt for a biometric input by the user. The log in page can be to log in for access to any resource provided by the service provider such as access to a web site, an application or a service offered by that particular service provider.

After configuration, the application platform 210 can serve a self-registration page for a particular service provider to end users, and the end users can complete the self-registration process that has been configured for that particular service provider. After successfully completing the self-registration process, the end users can then access an interview-based log in page that has been configured for that particular service provider and complete a log in process that has been configured for that particular service provider. Any of the end users who successfully complete the log in process can then access (via user systems 212-2 . . . 212-4 of end users) protected resources provided via the application platform 210 for that particular service provider if or until the session expires in which case the user would need to re-log in (e.g., using the discovery-based log in option).

Various events or tasks performed by the various elements in FIG. 2 will be described in greater detail below with reference to FIGS. 3-7. For example, certain operations performed at or by the user systems 212, the organizations 250, the application platform 210, the user self-registration configuration module 226, the log in configuration module 228, and the database systems 230 will be described below. In that regard, FIGS. 3-7 will be described with continued reference to FIG. 2.

Automated Setup of User Self-Registration Process and Page

Figure 3:
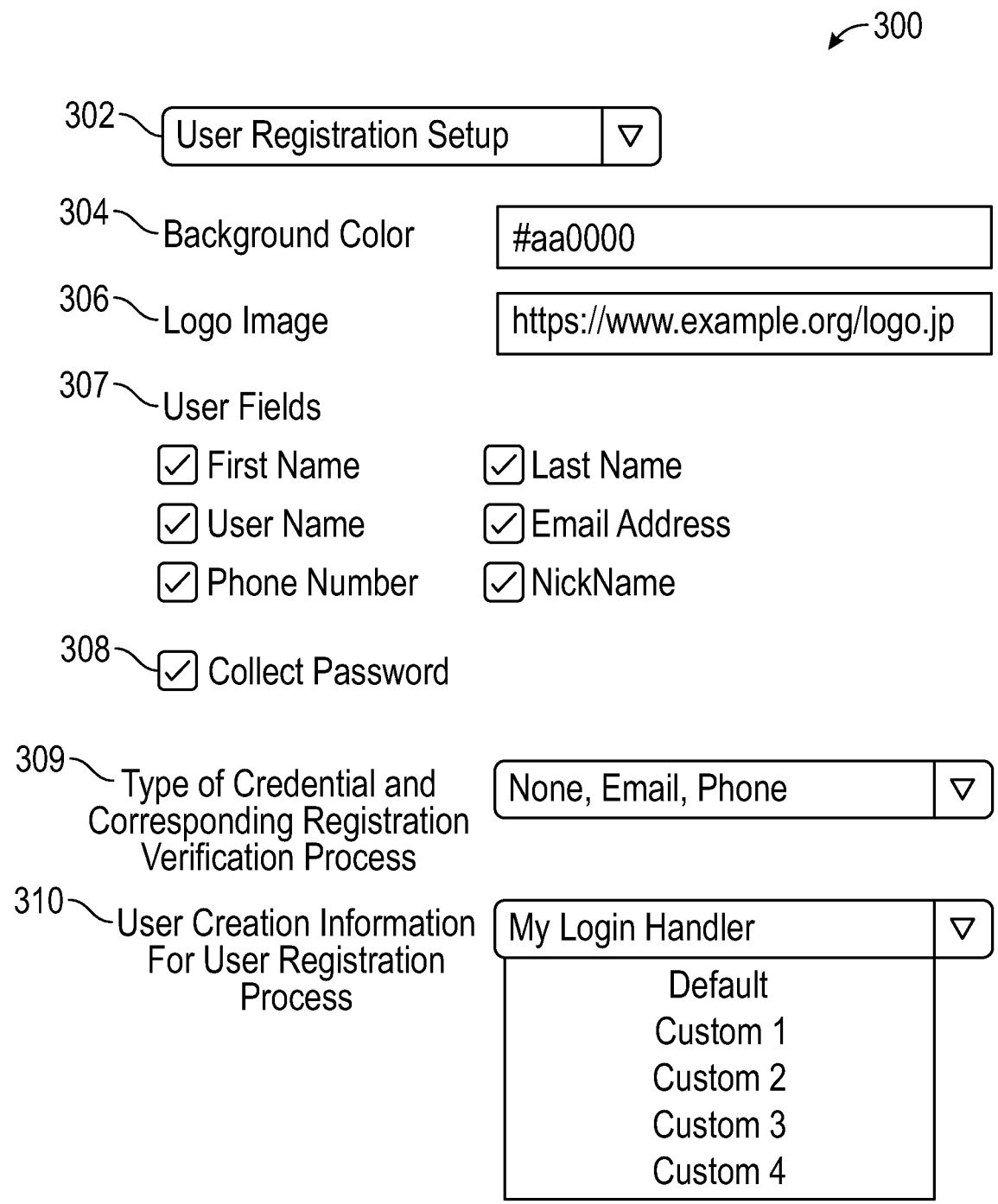
FIG. 3 illustrates a non-limiting example of a graphical user interface that is displayed at a user system of the administrator of a particular service provider for configuring or setting up a user self-registration process and page for that particular service provider in accordance with the disclosed embodiments.
Figure 4:
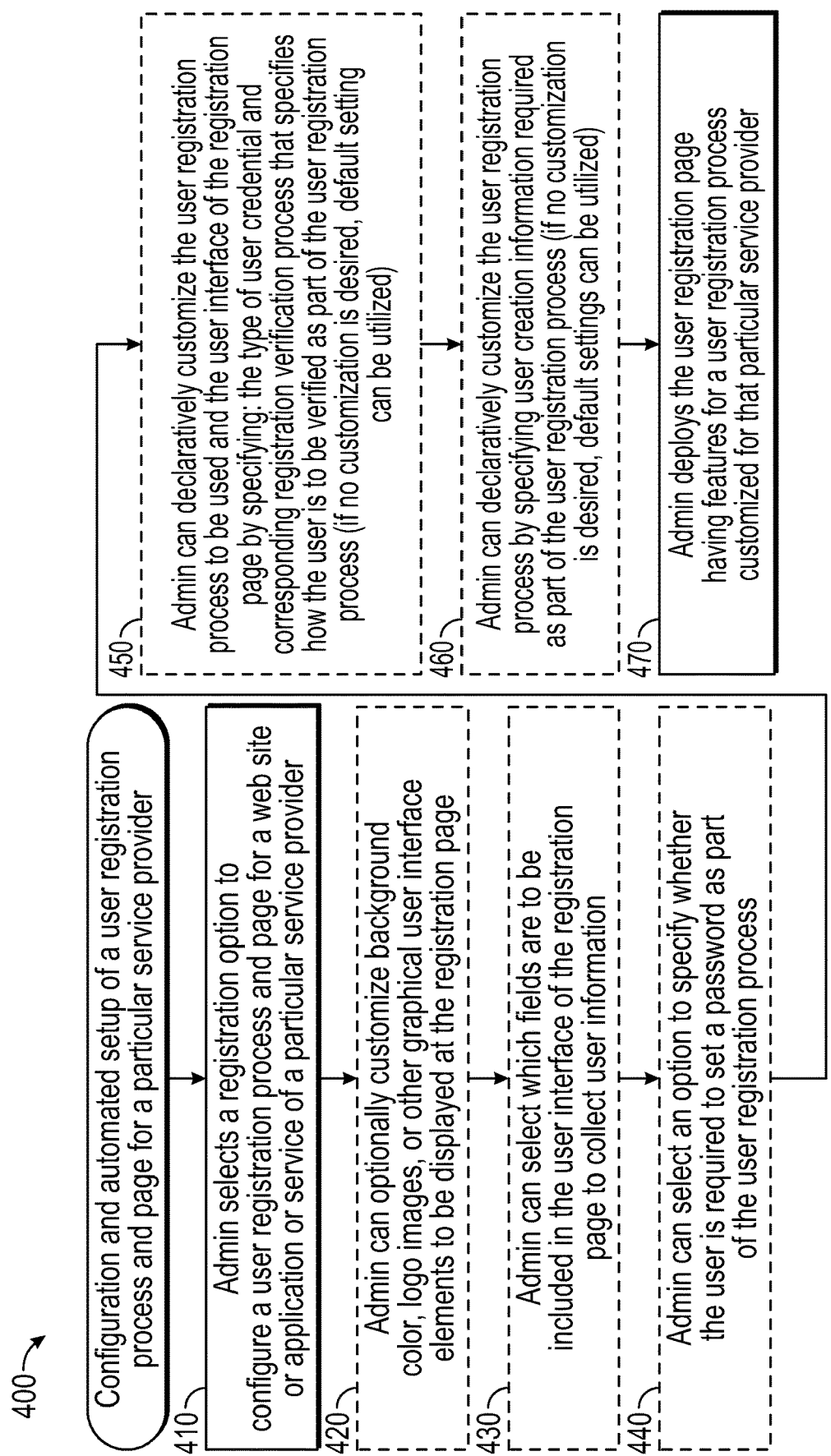
FIG. 4 is a flow chart that illustrates an exemplary method for configuring or setting up a user self-registration process and page for a particular service provider in accordance with the disclosed embodiments.

FIG. 3 illustrates a graphical user interface that is displayed at a user system of the administrator of a particular service provider for configuring or setting up a user self-registration process and page for that particular service provider in accordance with the disclosed embodiments. FIG. 4 illustrates a method 400 for configuring or setting up a user self-registration process and page for a particular service provider in accordance with the disclosed embodiments. FIG. 4 will be described with reference to certain graphical user interface elements shown in FIG. 3.

As a preliminary matter, it should be understood that the user interface of FIG. 3 and the steps of the method 400 are not necessarily limiting. With reference to method 400, steps can be added, omitted, and/or performed simultaneously without departing from the scope of the appended claims. It should be appreciated that the method 400 may include any number of additional or alternative tasks, that the tasks shown in FIG. 4 need not be performed in the illustrated order, and that the method 400 may be incorporated into a more comprehensive procedure or process having additional functionality not described in detail herein. Moreover, one or more of the tasks shown in FIG. 4 could potentially be omitted from an embodiment of the method 400 as long as the intended overall functionality remains intact. It should also be understood that the illustrated method 400 can be stopped at any time. The method 400 is computer-implemented in that various tasks or steps that are performed in connection with the method 400 may be performed by software, hardware, firmware, or any combination thereof. For illustrative purposes, the following description of the method 400 may refer to elements mentioned above in connection with FIGS. 1 and 2. In certain embodiments, some or all steps of this process, and/or substantially equivalent steps, are performed by execution of processor-readable instructions stored or included on a processor-readable medium. For instance, in the description of FIG. 4 that follows, the user systems 212, and the application platform 210 will be described as performing various acts, tasks or steps, but it should be appreciated that this refers to processing system(s) of these entities executing instructions to perform those various acts, tasks or steps. Depending on the implementation, some of the processing system(s) can be centrally located, or distributed among a number of server systems that work together. Furthermore, in the description of FIG. 4, a particular example is described in which a user of a user system performs certain actions by interacting with other elements of the system via the user system. Various acts, tasks or steps FIG. 4 will be described below with reference to screenshots shown in FIG. 3.

As shown in FIG. 4, the method 400 begins at 410, where an administrator for a particular service provider selects a user self-registration option to configure the user self-registration process and corresponding web page. The user self-registration page can be, for example, a user self-registration page for a web site, application or service offered by that particular service provider. In one embodiment, the user self-registration page can be, for example, a user self-registration page for a web site, application or service that is served or provided by the application platform for a particular organization or for a particular tenant of a particular organization of a cloud-based multi-tenant system.

In one embodiment, shown in FIG. 3, the administrator for a particular service provider can utilize a drop-down menu 302 to select a user self-registration setup option that allows the administrator to configure the user self-registration process and corresponding web page for deployment by that particular service provider. In one non-limiting embodiment, the user self-registration process is "interview-based" meaning that a user accessing the self-registration page is asked to fill in increasing amounts of information as they proceed through the self-registration process, and the information requested may vary depending on information previously provided.

At 420 of FIG. 4, the administrator for the particular service provider can optionally customize graphical user interface elements and features that are to be displayed as part of the user self-registration page. As shown in FIG. 3, in one embodiment, the administrator may, if they choose, specify things such as a background color (via text field 304), logo images (via text field 306), or other graphical user interface elements (via other text fields that are not illustrated) that are to be displayed as part of the user self-registration page, etc.

At 430, the administrator for the particular service provider can select which user fields are to be included in the user interface of the self-registration page to collect user information during the user self-registration process. In one non-limiting implementation illustrated in FIG. 3, examples of user fields 307 can include first name of the user, last name of the user, username of the user, email address of the user, phone number of the user, nickname of the user, first name of the user, but many other types of user fields could be included depending on the implementation. In this implementation, the administrator for the particular service provider can check selected check boxes to select which ones of the user fields 307 are to be included in the user interface of the self-registration page to collect user information during the user self-registration process. In this example, the administrator has selected all of the user fields that are listed.

At 440, the administrator for the particular service provider can select an option to specify whether the user is required to set a password as part of the user self-registration process. In one non-limiting implementation illustrated in FIG. 3, the administrator for the particular service provider can check a check box labeled "Collect Password" to specify whether the user is required to set a password as part of the user self-registration process. In this example, the administrator has selected the "Collect Password" check box.

At 450, the administrator for the particular service provider can declaratively customize the user self-registration process and the user interface elements that are used to define the user self-registration page for the particular service provider (e.g., for a particular organization or for a particular tenant of a particular organization). For example, the administrator for the particular service provider can specify the type of user credential and corresponding self-registration verification process that specifies how the user is to be verified as part of the user self-registration process. The administrator can specify either custom or default options for the type of user credential and corresponding self-registration verification process.

For example, the administrator can select various options (e.g., using the dropdown menu 309 of FIG. 3) to customize the type of user credential and corresponding self-registration verification process. By specifying the type of user credential, the administrator can define how the user can be contacted to complete the self-registration process. Non-limiting examples of the types of user credentials that can be selected by the admin can include email address, telephone number, or any other unique identifier for communication means associated with the user. As part of the self-registration process, the user can also be asked to submit other information to complete the self-registration process. For example, the user may be asked to provide biometric information or identifiers (e.g., metrics related to human characteristics) via a mobile device to complement the identity information. In addition, or alternatively, other information to complete the self-registration process can include, for example, calling a user's landline phone with an interactive voice recognition system, messaging the user on a third-party platform (e.g., Google® Hangouts), or a custom company-provided mechanism like notifying a manager via email to click a link.

As part of self-registration setup, an administrator can either: select a default self-registration verification process, select an existing self-registration verification process from various options, create and customize a new self-registration verification process (e.g., via the handler class that actually determines how the user is created), or select an existing self-registration verification process and modify it. The corresponding self-registration verification process allows to administrator to specify or define how a user will be verified during the self-registration process after entering a credential at a prompt presented at the self-registration page. In one embodiment, the administrator can specify their own custom self-registration verification process (at 350) by specifying how a user is created during the self-registration process. In one embodiment, the admin can select from various options for the type of user credential and an associated self-registration verification process that can include, for example, any known types of identity verification challenge. Non-limiting examples of corresponding self-registration verification process that can be selected by the administrator can include a prompt for a one-time-password or passcode sent via text message or via email message, a redirection to an identity provider for verification during self-registration (e.g., Facebook or Security Assertion Markup Language (SAML) identity provider for exchanging authentication and authorization data between the identity provider and a service provider), etc. When no customization is desired, the administrator can select (at 350) a default user credential and a default self-registration verification process corresponding to that default user credential.

At 460, the administrator for the particular service provider can further declaratively customize the user self-registration process and the user interface elements that are used to define the user self-registration page for the particular service provider (e.g., for a particular organization or for a particular tenant of a particular organization). For example, the administrator for the particular service provider can specify user creation information required as part of the user self-registration process. The administrator can specify either custom or default options for user creation information. The administrator can select various options (e.g., using the dropdown menu 310 of FIG. 3), such as, a default username for the user, the type of user and its association to other entries in the database such as a contact entry used for marketing purposes, access privileges of the user, etc. In addition, the administrator can customize or extend the user creation information using, for example, a scripting language. When no customization is desired with respect to the user creation information, the administrator can select (at 350) default user creation information (to the extent it is specified).

The method 400 then ends at 470 when the administrator deploys the user self-registration page for the particular service provider having features for implementing a user self-registration process that has been defined or customized for the particular service provider. The flexibility of this approach can allow each service provider to easily build and deploy their own customized user self-registration solution without the need for customizing setup and coding efforts to do so. A configurable user self-registration capability can be provided within the application platform that is easily customizable by each service provider (e.g., organization and/or tenant) by selecting appropriate options within an easy to use GUI.

Automated Setup of Interview-Based Log In Process and Page

Figure 5:
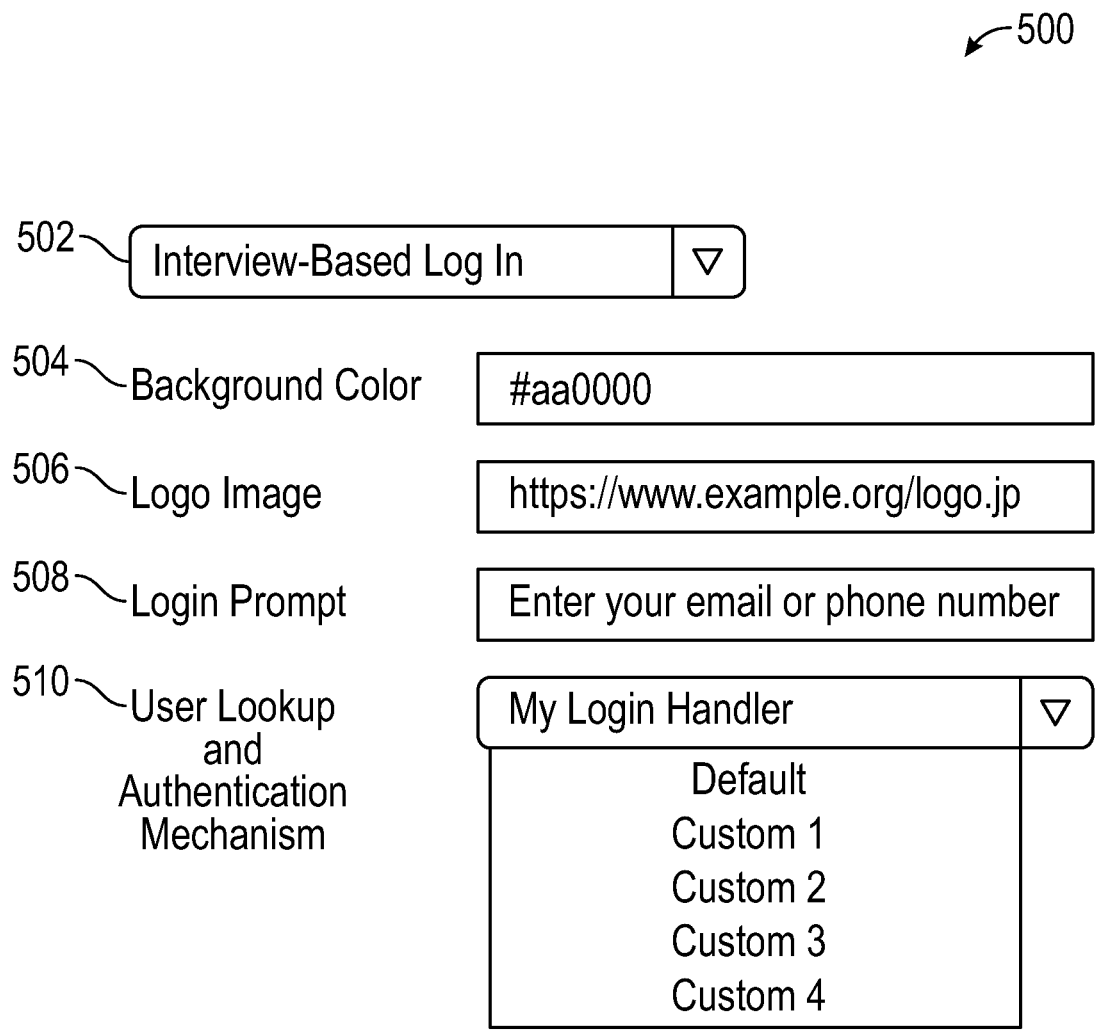
FIG. 5 illustrates a non-limiting example of a graphical user interface that is displayed at a user system of the administrator of a particular service provider for configuring or setting up an interview-based log in process and page for that particular service provider in accordance with the disclosed embodiments.

FIG. 5 illustrates a graphical user interface that is displayed at a user system of the administrator of a particular service provider for configuring or setting up an interview-based log in process and page for that particular service provider in accordance with the disclosed embodiments.

Figure 6:
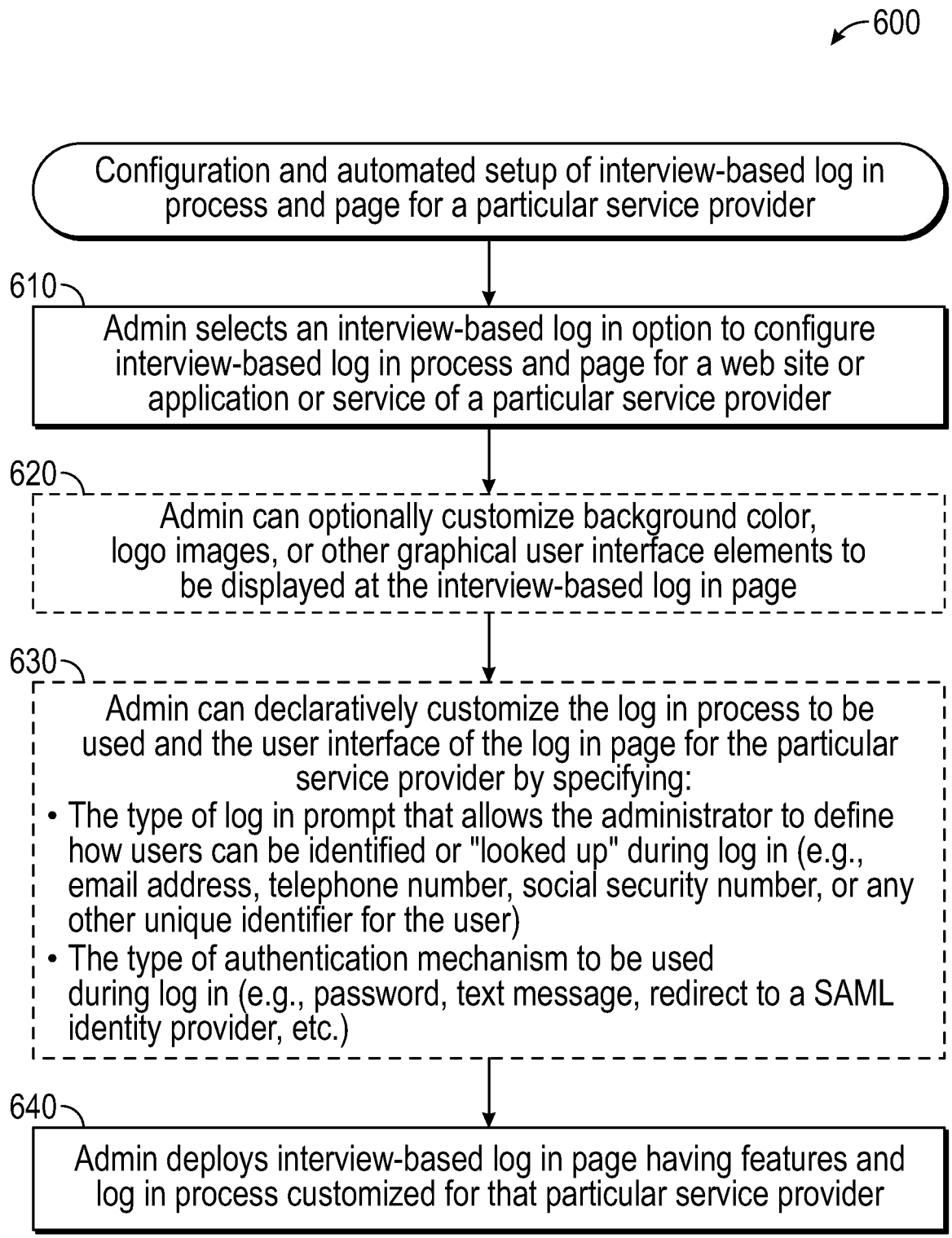
FIG. 6 is a flow chart that illustrates an exemplary method for configuring or setting up an interview-based log in process for a particular service provider in accordance with the disclosed embodiments.

FIG. 6 illustrates a method 600 for configuring or setting up an interview-based log in process for a particular service provider in accordance with the disclosed embodiments. FIG. 6 will be described with reference to certain user interface element shown in FIG. 5.

As a preliminary matter, it should be understood that the user interface of FIG. 5 and the steps of the method 600 are not necessarily limiting. With reference to method 600, steps can be added, omitted, and/or performed simultaneously without departing from the scope of the appended claims. It should be appreciated that the method 600 may include any number of additional or alternative tasks, that the tasks shown in FIG. 6 need not be performed in the illustrated order, and that the method 600 may be incorporated into a more comprehensive procedure or process having additional functionality not described in detail herein. Moreover, one or more of the tasks shown in FIG. 6 could potentially be omitted from an embodiment of the method 600 as long as the intended overall functionality remains intact. It should also be understood that the illustrated method 600 can be stopped at any time. The method 600 is computer-implemented in that various tasks or steps that are performed in connection with the method 600 may be performed by software, hardware, firmware, or any combination thereof. For illustrative purposes, the following description of the method 600 may refer to elements mentioned above in connection with FIGS. 1 and 2. In certain embodiments, some or all steps of this process, and/or substantially equivalent steps, are performed by execution of processor-readable instructions stored or included on a processor-readable medium. For instance, in the description of FIG. 6 that follows, the user systems 212, and the application platform 210 will be described as performing various acts, tasks or steps, but it should be appreciated that this refers to processing system(s) of these entities executing instructions to perform those various acts, tasks or steps. Depending on the implementation, some of the processing system(s) can be centrally located, or distributed among a number of server systems that work together. Furthermore, in the description of FIG. 6, a particular example is described in which a user of a user system performs certain actions by interacting with other elements of the system via the user system. Various acts, tasks or steps FIG. 6 will be described below with reference to screenshots shown in FIG. 5.

As shown in FIG. 6, the method 600 begins at 610, where an administrator for a particular service provider selects an interview-based log in option to configure the interview-based log in process and corresponding web page. The interview-based log in page can be, for example, an interview-based log in page for a web site or application offered by that particular service provider. In one embodiment, the interview-based log in page can be, for example, an interview-based log in page for a web site or application that is served or provided by the application platform for a particular organization or for a particular tenant of a particular organization of a cloud-based multi-tenant system.

In one embodiment, shown in FIG. 5, the administrator for a particular service provider can utilize a drop-down menu 502 to select an interview-based log in option that allows the administrator to configure an interview-based log in page for deployment. In one non-limiting embodiment, the interview-based log in page can employ a passwordless log in solution.

At 620 of FIG. 6, the administrator for the particular service provider can optionally customize graphical user interface elements and features that are to be displayed as part of the log in page. As shown in FIG. 5, in one embodiment, the administrator may, if they choose, specify things such as a background color (via text field 504), logo images (via text field 506), or other graphical user interface elements (via other text fields that are not illustrated) that are to be displayed as part of the log in page etc.

At 630, the administrator for the particular service provider can declaratively customize the interview-based log in process and the user interface elements that are used to define the interview-based log in process for the particular service provider (e.g., for a particular organization or for a particular tenant of a particular organization). In one non-limiting embodiment, the log in process, is "interview-based" meaning that a user accessing the log in page is asked to fill in increasing amounts of information as they proceed through the log in log in process, and the information requested may vary depending on information previously provided.

For example, the administrator for the particular service provider can customize the type of log in prompt that allows the administrator to define how users can be identified or "looked up" during log in. For instance, the administrator can select options such as email address, telephone number, social security number, or any other unique identifier for the user, as the type of log in prompt to be used by to identify or look-up the user. By specifying the type of log in prompt, the administrator can define how users of an application or service offered by for the particular service provider can be identified or "looked up" during log in (e.g., via Social Security number or last name). In addition, at 630, the administrator for the particular service provider can also customize the type of authentication mechanism to define how a user will be authenticated during the log in process after entering their identity information at the log in prompt. In one non-limiting embodiment, the authentication mechanism can include a prompt for a password, personal identification number or passcode, or any type of identity verification challenge, etc. The identity verification challenge can optionally be a 1-factor (1F) verification challenge, a 2-factor (2F) verification challenge, etc. depending on the implementation specified by the administrator. For instance, the administrator can select options such as prompt for a password, a prompt for a one-time-password or passcode sent via text message or via email message, a redirection to an identity provider (e.g., Facebook or Security Assertion Markup Language (SAML) identity provider for exchanging authentication and authorization data between the identity provider and a service provider), etc.

In one embodiment, as shown in FIG. 5, to customize the type of user look up and/or the type of authentication mechanism (e.g., type of identity verification challenge), the administrator for the particular service provider can select a customization option via dropdown menu 510 to specify a custom user look up and/or a custom authentication mechanism. In other words, the admin for the particular service provider can change not only how the users are identified or looked up, but also how the user is to be verified during log in. This capability is optional, but when desired, requires very little code to implement. However, in the event customization is not desired (at 630), the administrator for the particular service provider can select, via dropdown menu 510 (of FIG. 5), a default code-based handler class. The default code-based handler class defines default settings for (1) the type of log in prompt (i.e., user look-up logic or mechanism that specifies how the user is looked up), and (2) the default settings for type of authentication mechanism (e.g., type of identity verification challenge) to specify how the user is to be verified.

The method 600 then ends at 640 when the administrator deploys an interview-based log in page (not illustrated) for the particular service provider having features for implementing an interview-based log in process that has been defined for the particular service provider by the administrator. The flexibility of this approach can allow each service provider to easily build and deploy their own customized log in solution without the need for customizing setup and coding efforts to do so. A configurable log in capability can be provided within the application platform that is easily customizable by each service provider (e.g., organization and/or tenant) by selecting appropriate options within an easy to use GUI.

An example of this is illustrated in Table 1 of FIG. 7. Each organization/tenant can have multiple self-registration/log in setups for separate use cases (e.g., different service providers) (e.g., Salesforce communities). In accordance with the disclosed embodiments, a given organization/tenant can support multiple service providers, and each service provider can have different log in setups and/or self-registration setups that can be configured by an administrator. For example, an administrator for organization A can deploy an interview-based log in page/process for service provider 1 that during log in requires a user to enter: their email address (as look-up information that identifies the user) and a prompt for a one-time-passcode that is delivered to the user via text/SMS (as an authentication mechanism used to authenticate the user). On the other hand, the administrator for organization A can deploy a different interview-based log in page/process for service provider 2 that during log in requires a user to enter: the last four digits of their social security number (as look-up information that identifies the user), and a prompt for a password (as an authentication mechanism used to authenticate the user).

On the other hand, an administrator for an organization B can deploy an interview-based log in page/process that during log in requires users: to enter a phone number (as look-up information that identifies the user), and a prompt for a one-time-passcode that is delivered to the user via email (as an authentication mechanism used to authenticate the user). As another example, an administrator for an organization C can deploy an interview-based log in page/process that during log in requires users: to enter an email address (as look-up information that identifies the user), and that uses a redirection to another identity provider, such as Facebook, as the identity verification challenge (that verifies identity of the user). As another example, an administrator for an organization D can deploy an interview-based log in page/process that during log in requires users: to enter an email address (as look-up information that identifies the user), and a prompt for a one-time-passcode that is delivered to the user via email (as an authentication mechanism used to authenticate the user). As another example, an administrator for an organization E can deploy an interview-based log in page/process that during log in requires users: to enter some other identifier or identifying information that uniquely identifies the user, such as a self-selected vanity url, as look-up information, as look-up information (that identifies the user), and that uses a redirection to another SAML identity provider as the authentication mechanism used to authenticate the user. These six examples are non-limiting, and in general, any combination of look-up information that can be used to identify a user, and authentication mechanism that can be used to verify identity of an identified user can be configured by the administrator. For instance, the authentication mechanism used to authenticate the user could be completed with a hardware token (e.g., U2F Security Key), any token-based identification, any knowledge-based identification (e.g., a password or personal identification number) or any form of biometric authentication (e.g., asking for a biometric on a mobile device such as fingerprint, palm veins, face recognition, DNA, palm print, hand geometry, iris recognition, retina, voice samples, etc., and performing a one-to-one comparison of a captured biometric with a specific template stored in a biometric database in order to verify the individual is the person they claim to be). Other authentication mechanisms can include calling a user's landline phone with an interactive voice recognition system, messaging the user on a third-party platform like Google® Hangouts, or a custom company-provided mechanism like notifying a manager via email to click a link. The examples above are non-limiting.

The following description is of one example of a system in which the features described above may be implemented. The components of the system described below are merely one example and should not be construed as limiting. The features described above with respect to FIGS. 1-7 may be implemented in any other type of computing environment, such as one with multiple servers, one with a single server, a multi-tenant server environment, a single-tenant server environment, or some combination of the above.

Figure 8:
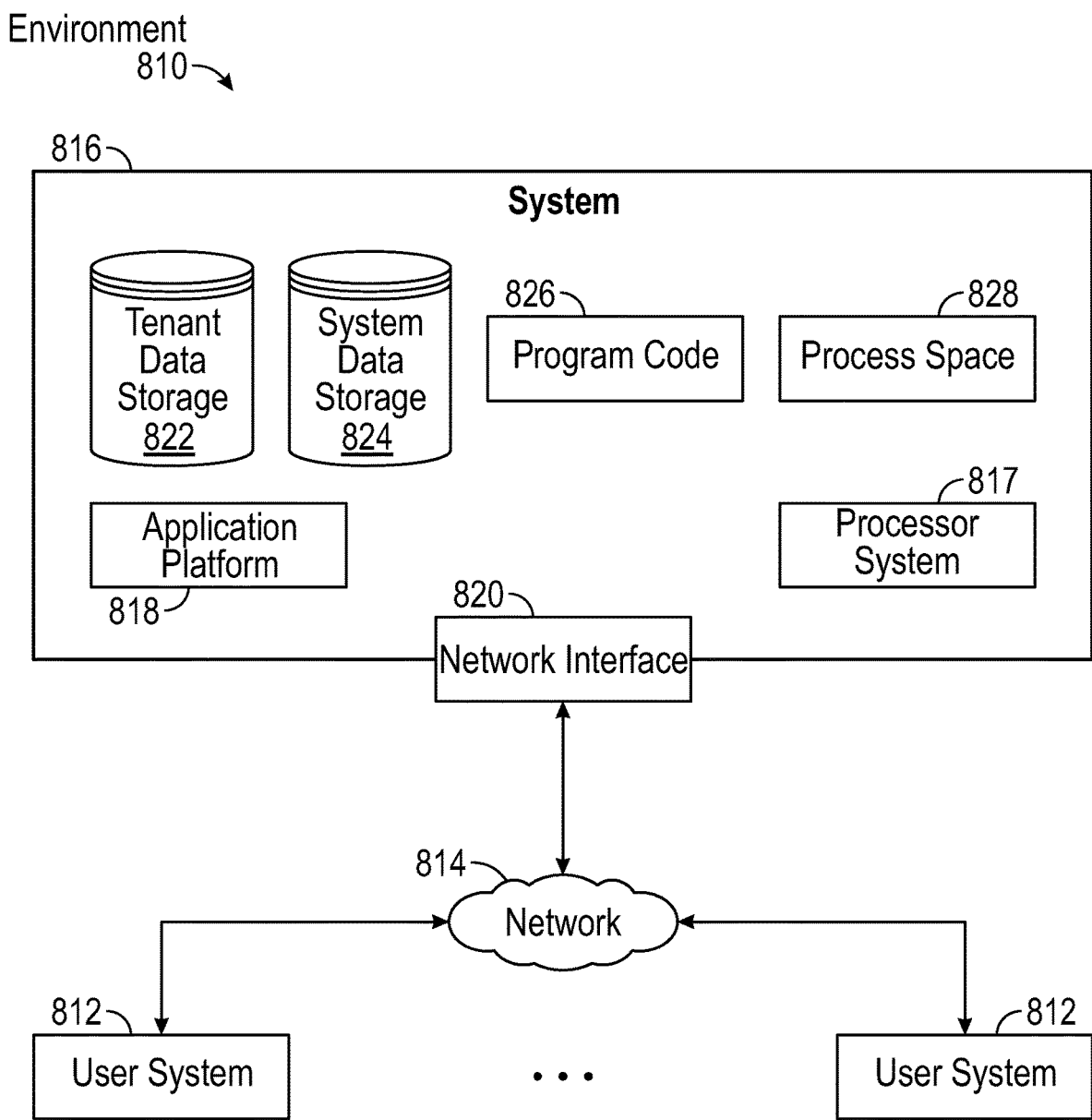
FIG. 8 shows a block diagram of an example of an environment in which an on-demand database service can be used in accordance with some implementations.

FIG. 8 shows a block diagram of an example of an environment 810 in which an on-demand database service can be used in accordance with some implementations. The environment 810 includes user systems 812, a network 814, a database system 816 (also referred to herein as a "cloud-based system"), a processor system 817, an application platform 818, a network interface 820, tenant database 822 for storing tenant data 823, system database 824 for storing system data 825, program code 826 for implementing various functions of the system 816, and process space 828 for executing database system processes and tenant-specific processes, such as running applications as part of an application hosting service. In some other implementations, environment 810 may not have all of these components or systems, or may have other components or systems instead of, or in addition to, those listed above.

In some implementations, the environment 810 is an environment in which an on-demand database service exists. An on-demand database service, such as that which can be implemented using the system 816, is a service that is made available to users outside of the enterprise(s) that own, maintain or provide access to the system 816. As described above, such users generally do not need to be concerned with building or maintaining the system 816. Instead, resources provided by the system 816 may be available for such users' use when the users need services provided by the system 816; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 818 can be a framework that allows the applications of system 816 to execute, such as the hardware or software infrastructure of the system 816. In some implementations, the application platform 818 enables the creation, management and execution of one or more applications developed by the provider of the on-demand database service, users accessing the on-demand database service via user systems 812, or third-party application developers accessing the on-demand database service via user systems 812.

In some implementations, the system 816 implements a web-based customer relationship management (CRM) system. For example, in some such implementations, the system 816 includes application servers configured to implement and execute CRM software applications as well as provide related data, code, forms, renderable web pages and documents and other information to and from user systems 812 and to store to, and retrieve from, a database system related data, objects, and Web page content. In some MTS implementations, data for multiple tenants may be stored in the same physical database object in tenant database 822. In some such implementations, tenant data is arranged in the storage medium(s) of tenant database 822 so that data of one tenant is kept logically separate from that of other tenants so that one tenant does not have access to another tenant's data, unless such data is expressly shared. The system 816 also implements applications other than, or in addition to, a CRM application. For example, the system 816 can provide tenant access to multiple hosted (standard and custom) applications, including a CRM application. User (or third party developer) applications, which may or may not include CRM, may be supported by the application platform 818. The application platform 818 manages the creation and storage of the applications into one or more database objects and the execution of the applications in one or more virtual machines in the process space of the system 816.

According to some implementations, each system 816 is configured to provide web pages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 814 can be or include any network or combination of networks of systems or devices that communicate with one another. For example, the network 814 can be or include any one or any combination of a LAN (local area network), WAN (wide area network), telephone network, wireless network, cellular network, point-to-point network, star network, token ring network, hub network, or other appropriate configuration. The network 814 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 812 can communicate with system 816 using TCP/IP and, at a higher network level, other common Internet protocols to communicate, such as HTTP, FTP, AFS, WAP, etc. In an example where HTTP is used, each user system 812 can include an HTTP client commonly referred to as a "web browser" or simply a "browser" for sending and receiving HTTP signals to and from an HTTP server of the system 816. Such an HTTP server can be implemented as the sole network interface 820 between the system 816 and the network 814, but other techniques can be used in addition to or instead of these techniques. In some implementations, the network interface 820 between the system 816 and the network 814 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 812 can be implemented as any computing device(s) or other data processing apparatus or systems usable by users to access the database system 816. For example, any of user systems 812 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 812 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 816) of the user system 812 to access, process and view information, pages and applications available to it from the system 816 over the network 814.

Each user system 812 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 812 in conjunction with pages, forms, applications and other information provided by the system 816 or other systems or servers. For example, the user interface device can be used to access data and applications hosted by system 816, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 812 may differ in their respective capacities, and the capacity of a particular user system 812 can be entirely determined by permissions (permission levels) for the current user of such user system. For example, where a salesperson is using a particular user system 812 to interact with the system 816, that user system can have the capacities allotted to the salesperson. However, while an administrator is using that user system 812 to interact with the system 816, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 812 and some or all of its components are operator-configurable using applications, such as a browser, including computer code executed using a central processing unit (CPU) such as an Intel Pentium® processor or the like. Similarly, the system 816 (and additional instances of an MTS, where more than one is present) and all of its components can be operator-configurable using application (s) including computer code to run using the processor system 817, which may be implemented to include a CPU, which may include an Intel Pentium® processor or the like, or multiple CPUs.

The system 816 includes tangible computer-readable media having non-transitory instructions stored thereon/in that are executable by or used to program a server or other computing system (or collection of such servers or computing systems) to perform some of the implementation of processes described herein. For example, computer program code 826 can implement instructions for operating and configuring the system 816 to intercommunicate and to process web pages, applications and other data and media content as described herein. In some implementations, the computer code 826 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 9:
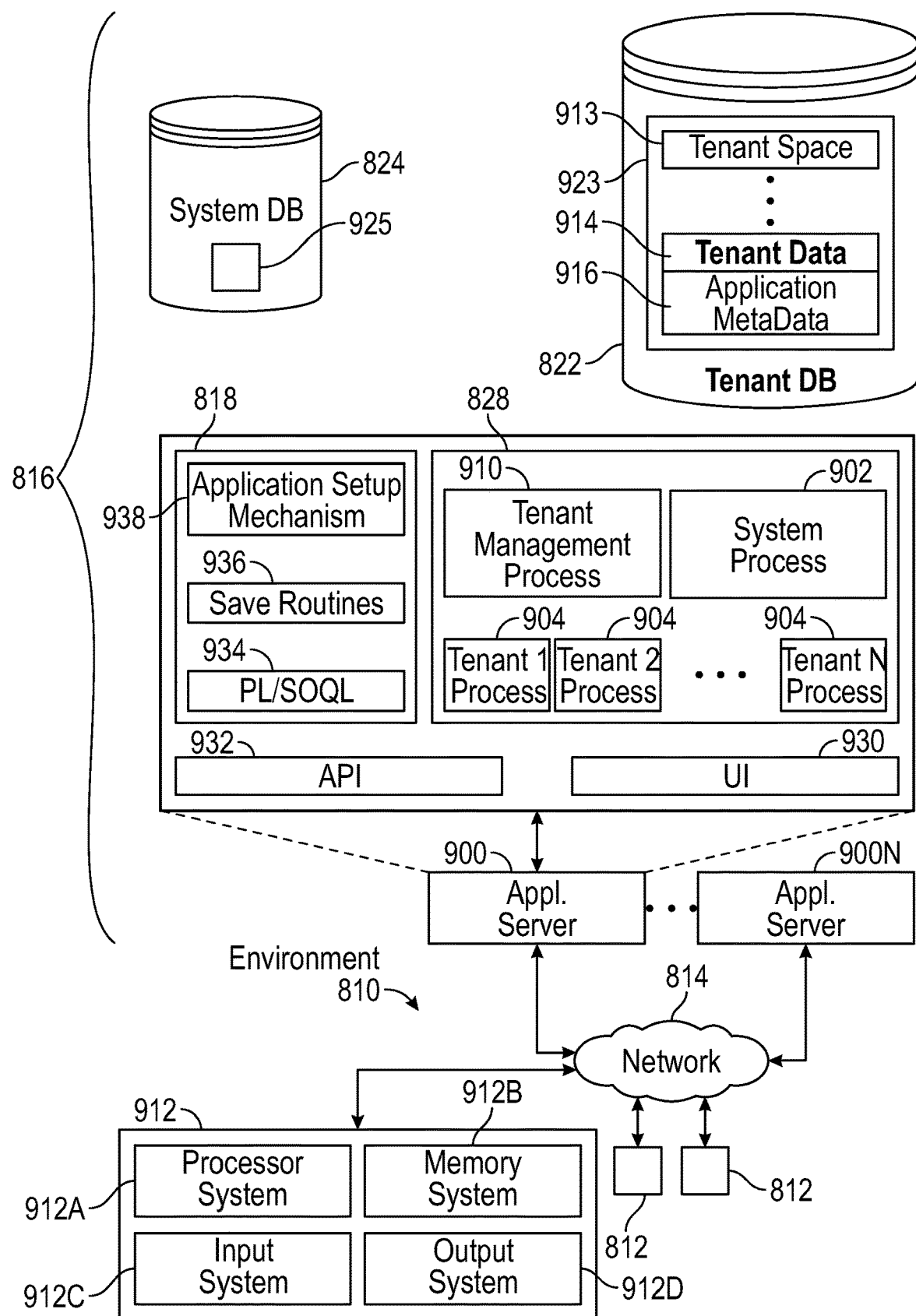
FIG. 9 shows a block diagram of example implementations of elements of FIG. 8 and example interconnections between these elements according to some implementations.

FIG. 9 shows a block diagram of example implementations of elements of FIG. 8 and example interconnections between these elements according to some implementations. That is, FIG. 9 also illustrates environment 810, but FIG. 9, various elements of the system 816 and various interconnections between such elements are shown with more specificity according to some more specific implementations. Elements from FIG. 8 that are also shown in FIG. 9 will use the same reference numbers in FIG. 9 as were used in FIG. 8. Additionally, in FIG. 9, the user system 812 includes a processor system 912A, a memory system 912B, an input system 912C, and an output system 912D. The processor system 912A can include any suitable combination of one or more processors. The memory system 912B can include any suitable combination of one or more memory devices. The input system 912C can include any suitable combination of input devices, such as one or more touchscreen interfaces, keyboards, mice, trackballs, scanners, cameras, or interfaces to networks. The output system 912D can include any suitable combination of output devices, such as one or more display devices, printers, or interfaces to networks.

In FIG. 9, the network interface 820 of FIG. 8 is implemented as a set of HTTP application servers $900_1$-$1400_N$. Each application server 900, also referred to herein as an "app server," is configured to communicate with tenant database 822 and the tenant data 923 therein, as well as system database 824 and the system data 925 therein, to serve requests received from the user systems 912. The tenant data 923 can be divided into individual tenant storage spaces 913, which can be physically or logically arranged or divided. Within each tenant storage space 913, tenant data 914 and application metadata 916 can similarly be allocated for each user. For example, a copy of a user's most recently used (MRU) items can be stored to user storage 914. Similarly, a copy of MRU items for an entire organization that is a tenant can be stored to tenant storage space 913.

The process space 828 includes system process space 902, individual tenant process spaces 904 and a tenant management process space 910. The application platform 818 includes an application setup mechanism 938 that supports application developers' creation and management of applications. Such applications and others can be saved as metadata into tenant database 822 by save routines 936 for execution by subscribers as one or more tenant process spaces 904 managed by tenant management process 910, for example. Invocations to such applications can be coded using PL/SOQL 934, which provides a programming language style interface extension to API 932. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 816 for the subscriber making the invocation and executing the metadata as an application in a virtual machine.

The system 816 of FIG. 9 also includes a user interface (UI) 930 and an application programming interface (API) 932 to system 816 resident processes to users or developers at user systems 912. In some other implementations, the environment 810 may not have the same elements as those listed above or may have other elements instead of, or in addition to, those listed above.

Each application server 900 can be communicably coupled with tenant database 822 and system database 824, for example, having access to tenant data 923 and system data 925, respectively, via a different network connection. For example, one application server $900_1$ can be coupled via the network 814 (for example, the Internet), another application server $900_N$ can be coupled via a direct network link, and another application server (not illustrated) can be coupled by yet a different network connection. Transfer Control Protocol and Internet Protocol (TCP/IP) are examples of typical protocols that can be used for communicating between application servers 900 and the system 816. However, it will be apparent to one skilled in the art that other transport protocols can be used to optimize the system 816 depending on the network interconnections used.

In some implementations, each application server 900 is configured to handle requests for any user associated with any organization that is a tenant of the system 816. Because it can be desirable to be able to add and remove application servers 900 from the server pool at any time and for various reasons, in some implementations there is no server affinity for a user or organization to a specific application server 900. In some such implementations, an interface system implementing a load balancing function (for example, an F5 Big-IP load balancer) is communicably coupled between the application servers 900 and the user systems 912 to distribute requests to the application servers 900. In one implementation, the load balancer uses a least-connections algorithm to route user requests to the application servers 900. Other examples of load balancing algorithms, such as round robin and observed-response-time, also can be used. For example, in some instances, three consecutive requests from the same user could hit three different application servers 900, and three requests from different users could hit the same application server 900. In this manner, by way of example, system 816 can be a multi-tenant system in which system 816 handles storage of, and access to, different objects, data and applications across disparate users and organizations.

In one example storage use case, one tenant can be a company that employs a sales force where each salesperson uses system 816 to manage aspects of their sales. A user can maintain contact data, leads data, customer follow-up data, performance data, goals and progress data, etc., all applicable to that user's personal sales process (for example, in tenant database 822). In an example of a MTS arrangement, because all of the data and the applications to access, view, modify, report, transmit, calculate, etc., can be maintained and accessed by a user system 912 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 816 that are allocated at the tenant level while other data structures can be managed at the user level.

Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 816 also can maintain system level data usable by multiple tenants or other data. Such system level data can include industry reports, news, postings, and the like that are shareable among tenants.

In some implementations, the user systems 912 (which also can be client systems) communicate with the application servers 900 to request and update system-level and tenant-level data from the system 816. Such requests and updates can involve sending one or more queries to tenant database 822 or system database 824. The system 816 (for example, an application server 900 in the system 816) can automatically generate one or more SQL statements (for example, one or more SQL queries) designed to access the desired information. System database 824 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 10A:
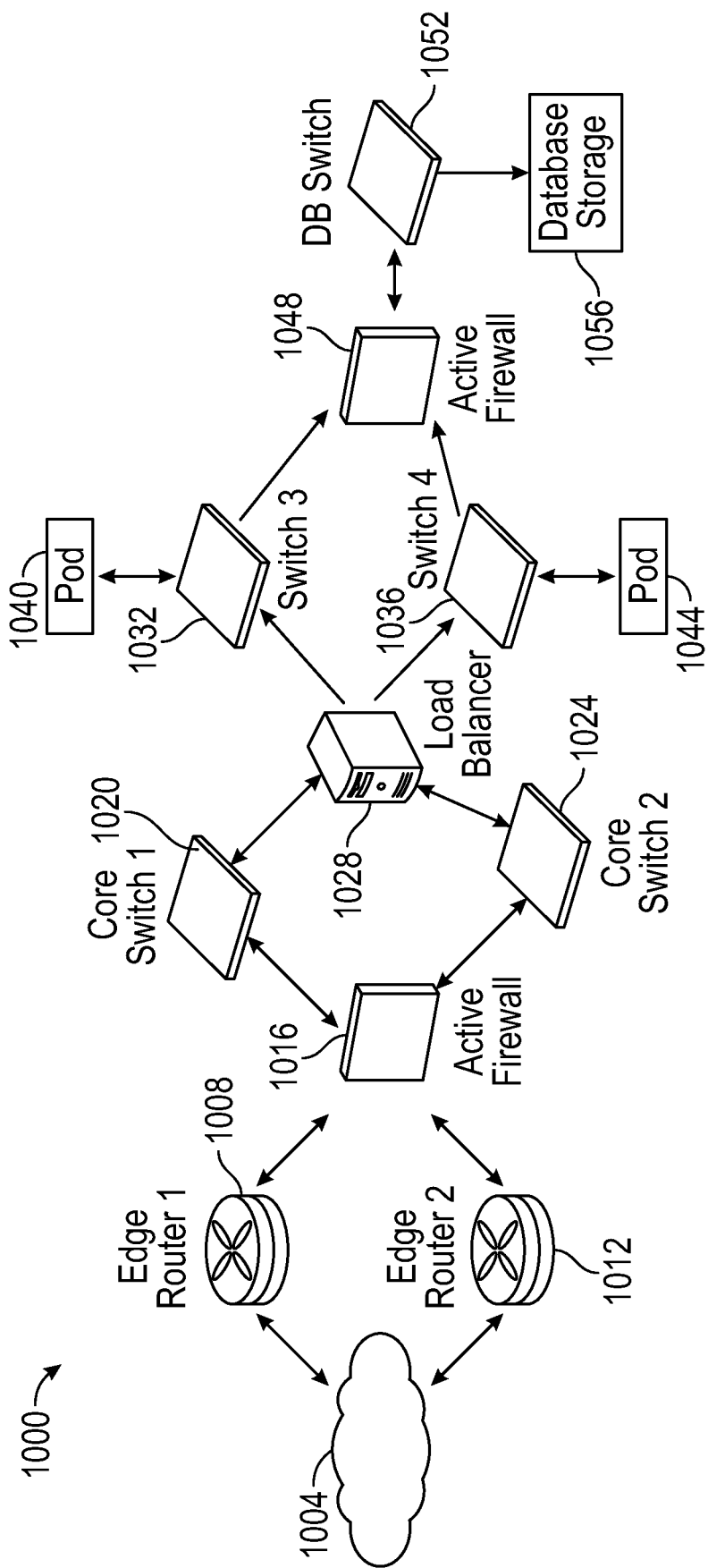
FIG. 10A shows a system diagram illustrating example architectural components of an on-demand database service environment according to some implementations.

FIG. 10A shows a system diagram illustrating example architectural components of an on-demand database service environment 1000 according to some implementations. A client machine communicably connected with the cloud 1004, generally referring to one or more networks in combination, as described herein, can communicate with the on-demand database service environment 1000 via one or more edge routers 1008 and 1012. A client machine can be any of the examples of user systems 12 described above. The edge routers can communicate with one or more core switches 1020 and 1024 through a firewall 1016. The core switches can communicate with a load balancer 1028, which can distribute server load over different pods, such as the pods 1040 and 1044. The pods 1040 and 1044, which can each include one or more servers or other computing resources, can perform data processing and other operations used to provide on-demand services. Communication with the pods can be conducted via pod switches 1032 and 1036. Components of the on-demand database service environment can communicate with database storage 1056 through a database firewall 1048 and a database switch 1052.

Figure 10B:
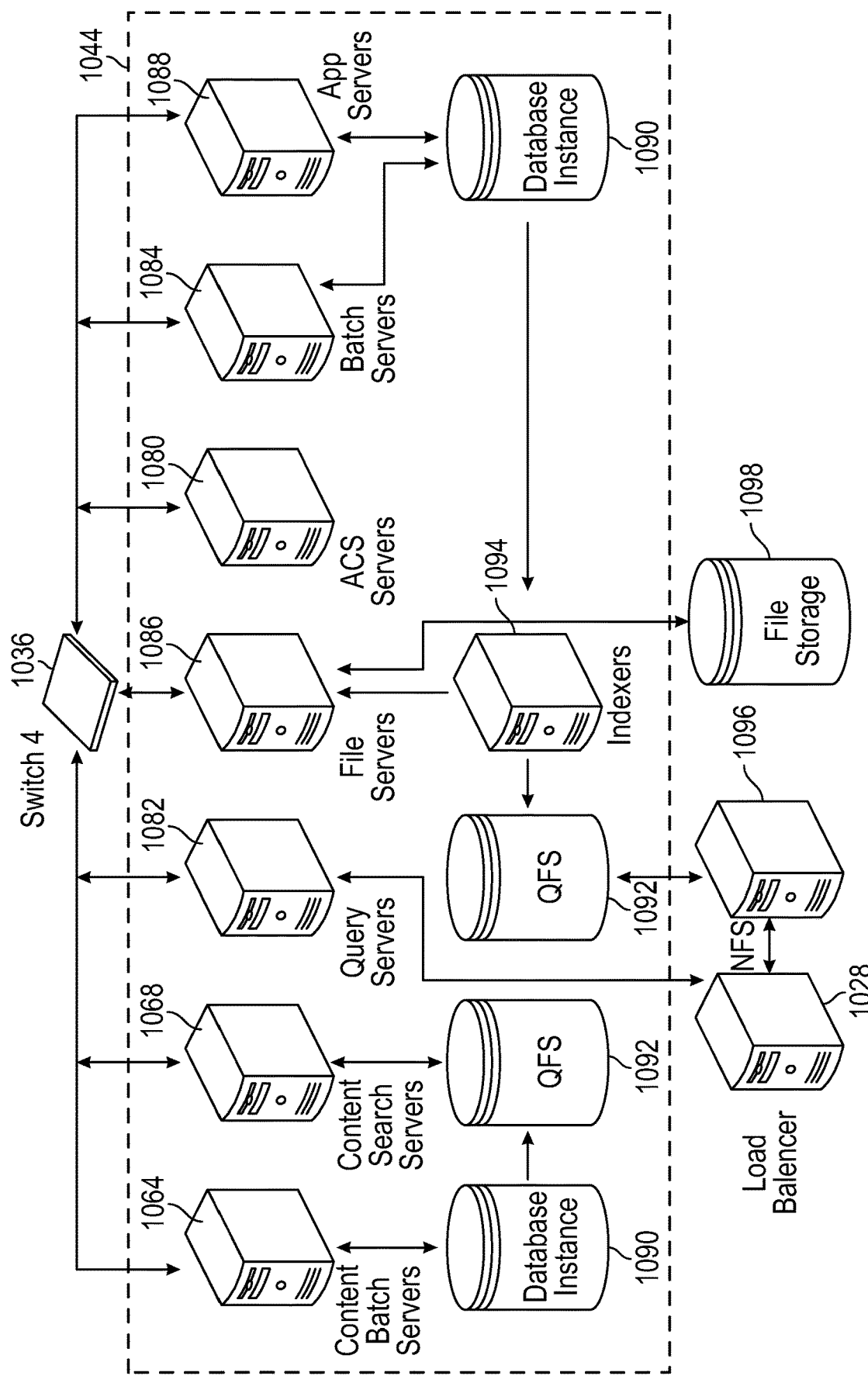
FIG. 10B shows a system diagram further illustrating example architectural components of an on-demand database service environment according to some implementations.

As shown in FIGS. 10A and 10B, accessing an on-demand database service environment can involve communications transmitted among a variety of different hardware or software components. Further, the on-demand database service environment 1000 is a simplified representation of an actual on-demand database service environment. For example, while only one or two devices of each type are shown in FIGS. 10A and 10B, some implementations of an on-demand database service environment can include anywhere from one to several devices of each type. Also, the on-demand database service environment need not include each device shown in FIGS. 10A and 10B, or can include additional devices not shown in FIGS. 10A and 10B.

Additionally, it should be appreciated that one or more of the devices in the on-demand database service environment 1000 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 1004 is intended to refer to a data network or multiple data networks, often including the Internet. Client machines communicably connected with the cloud 1004 can communicate with other components of the on-demand database service environment 1000 to access services provided by the on-demand database service environment. For example, client machines can access the on-demand database service environment to retrieve, store, edit, or process information. In some implementations, the edge routers 1008 and 1012 route packets between the cloud 1004 and other components of the on-demand database service environment 1000. For example, the edge routers 1008 and 1012 can employ the Border Gateway Protocol (BGP). The BGP is the core routing protocol of the Internet. The edge routers 1008 and 1012 can maintain a table of IP networks or 'prefixes', which designate network reachability among autonomous systems on the Internet.

In some implementations, the firewall 1016 can protect the inner components of the on-demand database service environment 1000 from Internet traffic. The firewall 1016 can block, permit, or deny access to the inner components of the on-demand database service environment 1000 based upon a set of rules and other criteria. The firewall 1016 can act as one or more of a packet filter, an application gateway, a stateful filter, a proxy server, or any other type of firewall.

In some implementations, the core switches 1020 and 1024 are high-capacity switches that transfer packets within the on-demand database service environment 1000. The core switches 1020 and 1024 can be configured as network bridges that quickly route data between different components within the on-demand database service environment. In some implementations, the use of two or more core switches 1020 and 1024 can provide redundancy or reduced latency.

In some implementations, the pods 1040 and 1044 perform the core data processing and service functions provided by the on-demand database service environment. Each pod can include various types of hardware or software computing resources. An example of the pod architecture is discussed in greater detail with reference to FIG. 10B. In some implementations, communication between the pods 1040 and 1044 is conducted via the pod switches 1032 and 1036. The pod switches 1032 and 1036 can facilitate communication between the pods 1040 and 1044 and client machines communicably connected with the cloud 1004, for example via core switches 1020 and 1024. Also, the pod switches 1032 and 1036 may facilitate communication between the pods 1040 and 1044 and the database storage 1056. In some implementations, the load balancer 1028 can distribute workload between the pods 1040 and 1044. Balancing the on-demand service requests between the pods can assist in improving the use of resources, increasing throughput, reducing response times, or reducing overhead. The load balancer 1028 may include multilayer switches to analyze and forward traffic.

In some implementations, access to the database storage 1056 is guarded by a database firewall 1048. The database firewall 1048 can act as a computer application firewall operating at the database application layer of a protocol stack. The database firewall 1048 can protect the database storage 1056 from application attacks such as structure query language (SQL) injection, database rootkits, and unauthorized information disclosure. In some implementations, the database firewall 1048 includes a host using one or more forms of reverse proxy services to proxy traffic before passing it to a gateway router. The database firewall 1048 can inspect the contents of database traffic and block certain content or database requests. The database firewall 1048 can work on the SQL application level atop the TCP/IP stack, managing applications' connection to the database or SQL management interfaces as well as intercepting and enforcing packets traveling to or from a database network or application interface.

In some implementations, communication with the database storage 1056 is conducted via the database switch 1052. The multi-tenant database storage 1056 can include more than one hardware or software components for handling database queries. Accordingly, the database switch 1052 can direct database queries transmitted by other components of the on-demand database service environment (for example, the pods 1040 and 1044) to the correct components within the database storage 1056. In some implementations, the database storage 1056 is an on-demand database system shared by many different organizations as described above with reference to FIG. 8 and FIG. 9.

FIG. 10B shows a system diagram further illustrating example architectural components of an on-demand database service environment according to some implementations. The pod 1044 can be used to render services to a user of the on-demand database service environment 1000. In some implementations, each pod includes a variety of servers or other systems. The pod 1044 includes one or more content batch servers 1064, content search servers 1068, query servers 1082, file force servers 1086, access control system (ACS) servers 1080, batch servers 1084, and app servers 1088. The pod 1044 also can include database instances 1090, quick file systems (QFS) 1092, and indexers 1094. In some implementations, some or all communication between the servers in the pod 1044 can be transmitted via the switch 1036.

In some implementations, the app servers 1088 include a hardware or software framework dedicated to the execution of procedures (for example, programs, routines, scripts) for supporting the construction of applications provided by the on-demand database service environment 1000 via the pod 1044. In some implementations, the hardware or software framework of an app server 1088 is configured to execute operations of the services described herein, including performance of the blocks of various methods or processes described herein. In some alternative implementations, two or more app servers 1088 can be included and cooperate to perform such methods, or one or more other servers described herein can be configured to perform the disclosed methods.

The content batch servers 1064 can handle requests internal to the pod. Some such requests can be long-running or not tied to a particular customer. For example, the content batch servers 1064 can handle requests related to log mining, cleanup work, and maintenance tasks. The content search servers 1068 can provide query and indexer functions. For example, the functions provided by the content search servers 1068 can allow users to search through content stored in the on-demand database service environment. The file force servers 1086 can manage requests for information stored in the File force storage 1098. The File force storage 1098 can store information such as documents, images, and basic large objects (BLOBs). By managing requests for information using the file force servers 1086, the image footprint on the database can be reduced. The query servers 1082 can be used to retrieve information from one or more file storage systems. For example, the query system 1082 can receive requests for information from the app servers 1088 and transmit information queries to the NFS 1096 located outside the pod.

The pod 1044 can share a database instance 1090 configured as a multi-tenant environment in which different organizations share access to the same database. Additionally, services rendered by the pod 1044 may call upon various hardware or software resources. In some implementations, the ACS servers 1080 control access to data, hardware resources, or software resources. In some implementations, the batch servers 1084 process batch jobs, which are used to run tasks at specified times. For example, the batch servers 1084 can transmit instructions to other servers, such as the app servers 1088, to trigger the batch jobs.

In some implementations, the QFS 1092 is an open source file storage system available from Sun Microsystems® of Santa Clara, Calif. The QFS can serve as a rapid-access file storage system for storing and accessing information available within the pod 1044. The QFS 1092 can support some volume management capabilities, allowing many disks to be grouped together into a file storage system. File storage system metadata can be kept on a separate set of disks, which can be useful for streaming applications where long disk seeks cannot be tolerated. Thus, the QFS system can communicate with one or more content search servers 1068 or indexers 1094 to identify, retrieve, move, or update data stored in the network file storage systems 1096 or other storage systems.

In some implementations, one or more query servers 1082 communicate with the NFS 1096 to retrieve or update information stored outside of the pod 1044. The NFS 1096 can allow servers located in the pod 1044 to access information to access files over a network in a manner similar to how local storage is accessed. In some implementations, queries from the query servers 1082 are transmitted to the NFS 1096 via the load balancer 1028, which can distribute resource requests over various resources available in the on-demand database service environment. The NFS 1096 also can communicate with the QFS 1092 to update the information stored on the NFS 1096 or to provide information to the QFS 1092 for use by servers located within the pod 1044.

In some implementations, the pod includes one or more database instances 1090. The database instance 1090 can transmit information to the QFS 1092. When information is transmitted to the QFS, it can be available for use by servers within the pod 1044 without using an additional database call. In some implementations, database information is transmitted to the indexer 1094. Indexer 1094 can provide an index of information available in the database 1090 or QFS 1092. The index information can be provided to file force servers 1086 or the QFS 1092.

Figure 11:
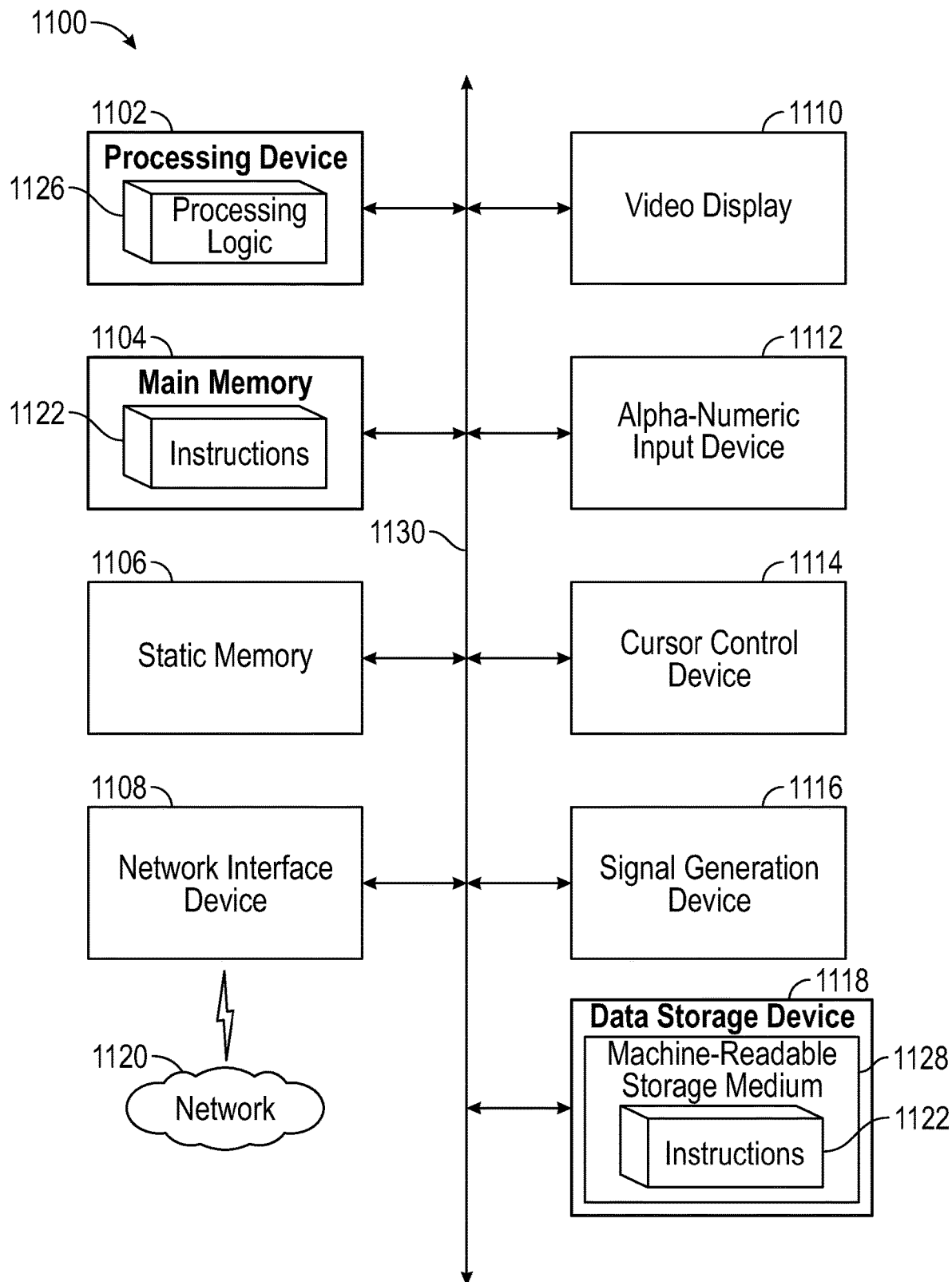
FIG. 11 illustrates a diagrammatic representation of a machine in the exemplary form of a computer system within which a set of instructions, for causing the machine to perform any one or more of the methodologies discussed herein, may be executed.

FIG. 11 illustrates a diagrammatic representation of a machine in the exemplary form of a computer system 1100 within which a set of instructions, for causing the machine to perform any one or more of the methodologies discussed herein, may be executed. The system 1100 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1100 includes a processing device (processor) 1102, a main memory 1104 (e.g., read-only memory (ROM), flash memory, dynamic random access memory (DRAM) such as synchronous DRAM (SDRAM)), a static memory 1106 (e.g., flash memory, static random access memory (SRAM)), and a data storage device 1118, which communicate with each other via a bus 1130.

Processing device 1102 represents one or more general-purpose processing devices such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1102 may also be one or more special-purpose processing devices such as an application specific integrated circuit (ASIC), a field programmable gate array (FPGA), a digital signal processor (DSP), network processor, or the like.

The computer system 1100 may further include a network interface device 1108. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker).

The data storage device 1118 may include a computer-readable medium 1128 on which is stored one or more sets of instructions 1122 (e.g., instructions of in-memory buffer service 114) embodying any one or more of the methodologies or functions described herein. The instructions 1122 may also reside, completely or at least partially, within the main memory 1104 and/or within processing logic 1126 of the processing device 1102 during execution thereof by the computer system 1100, the main memory 1104 and the processing device 1102 also constituting computer-readable media. The instructions may further be transmitted or received over a network 1120 via the network interface device 1108.

While the computer-readable storage medium 1128 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various special-purpose and general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for declaratively configuring a user self-registration process and a user self-registration page process for a particular service provider, the method comprising:
   displaying, at a user system of an administrator of the particular service provider, a graphical user interface that includes a plurality of options for declaratively configuring different user self-registration processes and corresponding user self-registration pages for the particular service provider;
   via the graphical user interface:
   selecting one of the options to configure the user self-registration process and the user self-registration page for deployment;
   specifying a type of identifier associated with a user to be verified as part of the user self-registration process for the particular service provider to define how the user is identified and looked-up during the user self-registration process for the particular service provider, wherein the type of identifier is one of a plurality of different types of identifiers that can be specified by the administrator; and
   specifying a type of verification process to define how the user will be verified as part of the user self-registration process for the particular service provider, wherein the type of verification process is one of a plurality of different types of verification processes that can be specified by the administrator.

2. The method according to claim 1, further comprising:
   automatically deploying the user self-registration page having features and logic for the user self-registration process that are customized for that particular service provider.

3. The method according to claim 1, wherein the user self-registration page is for a web site, an application or a service offered by that particular service provider via an application platform of a cloud-based server system,
   wherein the particular service provider is one of a plurality of service providers that offer resources to users via the application platform, and
   wherein administrators for each service provider can declaratively configure, via the graphical user interface, a customized user self-registration page and a corresponding customized user self-registration process and deploy the customized user self-registration page and the corresponding customized user self-registration process via the application platform.

4. The method according to claim 1, the method further comprising:
   selecting a user self-registration setup option to configure the user self-registration process and the corresponding user self-registration page for deployment by that particular service provider, wherein the corresponding user self-registration page is for a web site, an application or a service offered by that particular service provider that is provided by an application platform of a cloud-based multi-tenant system; and
   specifying a type of identifier associated with the user to be verified as part of the user self-registration process for the particular service provider, and the type of self-registration verification process to define how a user will be verified as part of the user self-registration process for the particular service provider after providing the type of identifier for the particular service provider.

5. The method according to claim 4, wherein the identifier is a user credential that defines how the user will contacted to complete the user self-registration process,
   wherein the self-registration verification process is a corresponding self-registration verification process that specifies how the user will be verified as part of the user self-registration process after entering the user credential at a prompt presented at the corresponding user self-registration page, and wherein the corresponding self-registration verification process allows the user credential entered at the prompt presented at the corresponding user self-registration page to be verified.

6. The method according to claim 4, further comprising: via the graphical user interface:

selecting which user fields are to be included in a graphical user interface of the corresponding self-registration page to collect user information during the user self-registration process, wherein the user fields comprise a first name of the user, a last name of the user, a username of the user, an email address of the user, a phone number of the user, and a nickname of the user;

selecting an option to specify whether the user is required to set a password as part of the user self-registration process; and specifying user creation information required as part of the user self-registration process.

7. The method according to claim 1, wherein the corresponding user self-registration page is for a web site, an application or a service offered by that particular service provider that is provided by an application platform of a cloud-based multi-tenant server system.

8. The method according to claim 1, wherein the type of identifier accepts one or more of: an email address of the user, a telephone number of the user, a social security number of the user, or another unique identifier for the user, and wherein the type of verification process includes one or more of: a prompt for a password, a prompt for a one-time-password or passcode sent to the user via text message or via email message, a redirection to an identity provider for authentication, and a prompt for a biometric input by the user.

9. A system comprising:

a user system of an administrator of a particular service provider, comprising:

a display configured to display a graphical user interface that includes a plurality of options for declaratively configuring different user self-registration processes and corresponding user self-registration pages for the particular service provider, wherein the graphical user interface is configured to receive:

a first input to select one of the options to configure the user self-registration process and the corresponding user self-registration page for deployment by that particular service provider;

a second input to specify a type of identifier associated with a user to be verified as part of the user self-registration process for the particular service provider, wherein the type of identifier defines how the user is identified and looked-up during the user self-registration process for the particular service provider, and wherein the type of identifier is one of a plurality of different types of identifiers that can be specified by the administrator; and a third input to specify a type of verification process to define how the user will be verified as part of the user self-registration process for the particular service provider, wherein the type of verification process defines how the user will be verified as part of the user self-registration process for that service provider, wherein the type of verification process is one of a plurality of different types of verification processes that can be specified by the administrator; and a server system in communication with the user system, wherein server system comprises:

an application platform is configured to receive the first input, the second input, and the third input, and to generate the user self-registration page based on the first input, the second input and the third input, wherein the user self-registration page comprises features and logic for the user self-registration process that are customized for that particular service provider.

10. The system according to claim 9, wherein the application platform is further configured to automatically deploy the user self-registration page in response to a request from the user, and wherein the user self-registration page is for a web site, an application or a service offered by that particular service provider via the application platform, wherein the server system is a cloud-based server system.

11. The system according to claim 9, wherein the particular service provider is one of a plurality of service providers that offer resources to users via the application platform, and wherein administrators for each service provider can declaratively configure, via the graphical user interface, a customized user self-registration page and a corresponding customized user self-registration process for that particular service provider, and automatically deploy the customized user self-registration page and the corresponding customized user self-registration process to users via the application platform upon configuration of the customized page and the corresponding customized user self-registration process.

12. The system according to claim 9, wherein the display is further configured to display:

another graphical user interface that is configured to receive:

a fourth input to select a user self-registration setup option to configure the user self-registration process and the corresponding user self-registration page for deployment by that particular service provider; and a fifth input to select from a plurality of options: a type of user credential that defines how the user will contacted after completing the user self-registration process, and a particular user self-registration process to define how the user will be verified for that service provider.

13. The system according to claim 9, wherein the particular user self-registration process is a corresponding self-registration verification process that specifies how the user will be verified as part of the user self-registration process after entering the user credential at a prompt presented at the corresponding user self-registration page, and wherein the corresponding self-registration verification process allows the user credential entered at the prompt presented at the corresponding user self-registration page to be verified.

14. The system according to claim 9, wherein the other graphical user interface is further configured to receive other inputs that specify:

user fields that are to be included in a graphical user interface of the corresponding self-registration page to collect user information during the user self-registration process, wherein the user fields comprise one or more of a first name of the user, a last name of the user, a username of the user, an email address of the user, a phone number of the user, and a nickname of the user;

whether the user is required to set a password as part of the user self-registration process; and user creation information required as part of the user self-registration process.

15. The system according to claim 9, wherein the corresponding user self-registration page is for a web site, an application or a service offered by that particular service provider that is provided by an application platform of a cloud-based multi-tenant system.

16. The system according to claim 9, wherein the type of identifier accepts one of: an email address of the user, a telephone number of the user, a social security number of the user, or another unique identifier for the user, and
wherein the type of verification process includes one or more of: a prompt for a password, a prompt for a one-time-password or passcode sent to the user via text message or via email message, a redirection to an identity provider for authentication, and a prompt for a biometric input by the user.

17. A computing system, comprising:
a processor; and
a display configured to display a graphical user interface, the graphical user interface comprising:
a first user interface element that presents a plurality of options for declaratively configuring different user self-registration processes and corresponding user self-registration pages for a particular service provider, wherein the graphical user interface is configured to receive a first input to select one of the plurality of options to configure a user self-registration process and a corresponding user self-registration page for automatic deployment by the particular service provider;
a second user interface element configured to receive a second input to declaratively specify a type of identifier associated with a user to be verified as part of the user self-registration process for the particular service provider, wherein the type of identifier is one of a plurality of different types of identifiers that can be specified, wherein each type of identifier defines how the user is identified and looked-up during the user self-registration process for that service provider; and
a third user interface element configured to receive a third input to declaratively specify a type of verification process to define how the user will be verified as part of the user self-registration process for the particular service provider, wherein the type of verification process is one of a plurality of different types of verification processes that can be specified by the administrator, and
wherein the processor is configured to communicate the first input, the second input, and the third input to a server system that comprises an application platform, wherein the application platform is configured to generate the corresponding user self-registration page based on the first input, the second input and the third input, wherein the corresponding user self-registration page comprises features and logic for the user self-registration process that are customized for that particular service provider.

18. The computing system according to claim 17, wherein the display is further configured to display another graphical user interface for a user self-registration process and a corresponding user self-registration page,
wherein a fourth input selects a user self-registration setup option to declaratively configure the user self-registration process and the corresponding user self-registration page for deployment by that particular service provider,
wherein a fifth input selects the type of verification process that defines how the user will be verified as part of the user self-registration process for the particular service provider after entering a user credential at the corresponding user self-registration page, and
wherein the corresponding user self-registration page is for a web site, an application or a service offered by that particular service provider that is provided by the application platform of a cloud-based multi-tenant system.

19. The computing system according to claim 18, wherein the identifier is a user credential that defines how the user will contacted to complete the user self-registration process,
wherein the verification process is a corresponding self-registration verification process that specifies how the user will be verified as part of the user self-registration process after entering a user credential at a prompt presented at the corresponding user self-registration page, and
wherein the corresponding self-registration verification process allows the user credential entered at the prompt presented at the corresponding user self-registration page to be verified.

20. The computing system according to claim 17, wherein the corresponding page is for a web site, an application or a service offered by that particular service provider that is provided by an application platform of a cloud-based multi-tenant system;
wherein the type of identifier accepts one of: an email address of the user, a telephone number of the user, a social security number of the user, or another unique identifier for the user; and
wherein the type of verification process includes one or more of: a prompt for a password, a prompt for a one-time-password or passcode sent to the user via text message or via email message, a redirection to an identity provider for authentication, and a prompt for a biometric input by the user.

* * * * *